US012584522B2

(12) United States Patent
Jawdat

(10) Patent No.: US 12,584,522 B2
(45) Date of Patent: Mar. 24, 2026

(54) HTS BEARING AND FLYWHEEL SYSTEMS AND METHODS

(71) Applicant: REVTERRA CORPORATION, Houston, TX (US)

(72) Inventor: BenMaan I. Jawdat, Houston, TX (US)

(73) Assignee: Revterra Corporation, Houston, TX (US)

( * ) Notice: Subject to any disclaimer, the term of this patent is extended or adjusted under 35 U.S.C. 154(b) by 1135 days.

(21) Appl. No.: 17/348,716

(22) Filed: Jun. 15, 2021

(65) Prior Publication Data

US 2022/0034363 A1 Feb. 3, 2022

Related U.S. Application Data

(60) Provisional application No. 63/039,454, filed on Jun. 15, 2020.

(51) Int. Cl.
*F16C 32/04* (2006.01)

(52) U.S. Cl.
CPC ...... *F16C 32/0438* (2013.01); *F16C 2326/00* (2013.01); *F16C 2360/00* (2013.01)

(58) Field of Classification Search
CPC .......................... F16C 32/0438; F16C 2326/00
See application file for complete search history.

(56) References Cited

U.S. PATENT DOCUMENTS

| | | | |
|---|---|---|---|
| 5,124,605 A | 6/1992 | Bitterly et al. | |
| 6,232,671 B1 * | 5/2001 | Gottfried, Jr. ......... | H02K 7/025 290/1 R |
| 6,603,230 B1 | 8/2003 | Abel | |
| 9,404,532 B2 | 8/2016 | Jawdat | |
| 10,077,805 B2 * | 9/2018 | Jawdat ................ | F16C 32/0438 |
| 11,105,368 B2 * | 8/2021 | Jawdat ................ | F16C 32/0438 |
| 2015/0018217 A1 | 1/2015 | Jawdat | |
| 2016/0285341 A1 | 9/2016 | Sung | |

(Continued)

FOREIGN PATENT DOCUMENTS

| | | |
|---|---|---|
| CN | 202172330 U | 3/2012 |
| DE | 2149337 A1 | 5/1973 |

(Continued)

OTHER PUBLICATIONS

RU 109807, translation (Year: 2010).*

(Continued)

*Primary Examiner* — Paul A Wartalowicz

(74) *Attorney, Agent, or Firm* — Mackey Law Firm PLLC

(57) ABSTRACT

A bearing and flywheel system can include a first bearing portion having an opening of a first dimension there through and a central longitudinal axis, a second bearing portion having a second dimension, the second dimension being smaller than the first dimension, and a flywheel coupled to the second bearing portion. The bearing portions can include high-temperature superconductor(s) and/or magnets. The second bearing portion can be disposed at least partially within the opening through the first bearing portion. A gap can exist between an outer surface of the second bearing portion and an inner surface of the first bearing portion. The second bearing portion can be configured to rotate relative to the first bearing portion.

21 Claims, 15 Drawing Sheets

(56) References Cited

U.S. PATENT DOCUMENTS

2020/0080511 A1*  3/2020  Gångfeldt ........... F16J 15/3276
2020/0259379 A1   8/2020  Sanders et al.

FOREIGN PATENT DOCUMENTS

| | | | |
|---|---|---|---|
| DE | 102018112496 | A1 | 11/2019 |
| JP | H08284956 | A | 11/1996 |
| JP | 2011112068 | A | 6/2011 |
| RU | 93028852 | A | 2/1996 |
| RU | 2364421 | C1 | 8/2009 |
| RU | 109807 | U1 | 10/2011 |
| RU | 2012120913 | A | 11/2013 |
| RU | 2709080 | C1 | 12/2019 |
| SU | 1499005 | A1 | 8/1989 |
| SU | 1731570 | A1 | 7/1992 |

OTHER PUBLICATIONS

PCT Application No. PCT/US2021/037517, International Search Report and Written Opinion dated Sep. 30, 2021.
Extended European Search Report dated May 2, 2024 for EP Application 21826126.1 filed Jun. 15, 2021.

* cited by examiner

100

106     104

102

110

A

104B

102B 108     104A

100

112

104

110

102A

III          III 102     126

300

300

400

410    XVI    404    414

406    406

404

412    414    404    402

400

404

406

402

HTS BEARING AND FLYWHEEL SYSTEMS AND METHODS

CROSS REFERENCE TO RELATED APPLICATIONS

This application claims the benefit of U.S. provisional patent application No. 63/039,454 filed Jun. 15, 2020. This application is a continuation-in-part of U.S. patent application Ser. No. 16/133,682 filed Sep. 17, 2018, which is a continuation of U.S. patent application Ser. No. 15/194,476 filed Jun. 27, 2016 (now U.S. Pat. No. 10,077,805 dated Sep. 18, 2018), which is to a continuation of U.S. patent application Ser. No. 14/140,224 filed Dec. 24, 2013 (now U.S. Pat. No. 9,404,532 dated Aug. 2, 2016), which claims the benefit of U.S. provisional patent application No. 61/844,766 filed Jul. 10, 2013. The entire contents of each of the above identified applications is hereby incorporated by reference herein.

STATEMENT REGARDING FEDERALLY SPONSORED RESEARCH OR DEVELOPMENT

Not applicable.

REFERENCE TO APPENDIX

Not applicable.

BACKGROUND OF THE INVENTION

Field of the Invention

The inventions disclosed and taught herein relate generally to bearing systems and more specifically relate to bearing and flywheel systems comprising high-temperature superconductors and applications thereof.

Description of the Related Art

Flywheel energy storage systems (FESS) are a robust alternative technology which is cheap, durable, and non-toxic, which has been around for over 100 years. They can undergo virtually unlimited charge/discharge cycles, have high power/energy density, and can tolerate a wide range of environmental conditions including high temperature. The main obstacles to large scale utilization can be broadly divided into two categories: flywheel strength and energy losses.

Flywheels store kinetic energy in the rotational inertia of a large steel or composite cylinder which is accelerated and decelerated using an electric motor/generator system. The energy stored is proportional to the mass, the square of the radius, and the square of the angular velocity:

$$E_k = \tfrac{1}{2} I \omega^2$$

where $E_k$ is the rotational kinetic energy, I is the moment of inertia and $\omega$ is angular velocity.

For a flywheel composed of a thin disk, the moment of inertia is:

$$I = \tfrac{1}{2} m r^2$$

where I is the moment of inertia, m is the mass and r is the distance between the axis and rotation mass.

In order to take advantage of the omega squared term, a flywheel should rotate as fast as possible. This means that the factor determining the energy density of the system is the strength and stiffness of the flywheel material used:

$$e = \frac{KE}{m} = K \frac{\sigma}{\rho}$$

where e is the energy density, KE is the kinetic energy of the flywheel, m is the mass of the flywheel, and $\sigma$ and $\rho$ are the tensile strength and density of the rotor material, respectively. Composite flywheels have high tensile strength and are capable of high energy density (comparable to lithium-ion batteries in some cases), while steel flywheels have lower strength but are significantly cheaper—a more important metric for utility scale storage. However, if steel flywheels fail, they often break into a few large pieces and can carry a lot of energy, which can be dangerous.

There have generally been two approaches to flywheel materials: very high tensile strength composites or high-density steel. In the case of high tensile strength composites, the cost is relatively high, and in the case of high-density steel, the cost is relatively low but there is less energy density and there is the failure concern discussed above.

Losses in a flywheel energy storage system can be generally split into two categories: loss due to the bearings and loss due to the electric machine (motor/generator system). Conventional bearing systems typically include various components that are mechanically coupled to one another, such as roller bearings disposed in a race. Such systems are subject to various limitations, including limitations due to friction. Lubricants, such as grease or oil, can be employed in an effort to reduce the unwanted effects of friction, such as the production of heat, but friction can nonetheless render conventional systems insufficient for certain applications. Consequently, many conventional movement systems are limited by friction, such as between the atmosphere and a body moving through it, or within the body itself, such as between bearings, gears or other components. Examples of conventional applications that suffer from the limitations imposed by friction include virtually any machine having moving parts, such as a wheel turning about an axle, blades rotating about a support, generators, turbines, pulleys, flywheel energy storage systems, among others.

In order to avoid bearing loss, magnetic levitation can be utilized. However, flywheels that utilize electromagnetic bearings still lose energy due to their inherent instability. Constant input power can be used to actively stabilize bearings that use magnets because of Earnshaw's theorem, which essentially states that a collection of magnets generally cannot passively be in stable equilibrium. An external stabilizing force is therefore required. In most commercially available systems, an actively controlled electromagnet-based system is used to provide this external stabilization at the cost of increased energy consumption and complexity.

High temperature superconducting (HTS) bearings can solve this issue by providing passive stabilization and levitation. HTS materials allow for passively stabilized levitation due to two unique features: the first is the Meissner effect, where the superconductor will expel any magnetic field upon cooling below its critical temperature, and the second is flux-pinning, where magnetic flux lines become trapped in the material, providing a restoring force back to a fixed relative orientation of the magnet with respect to the superconductor.

However, at least some currently available HTS bearings suffer from several issues. The first of these issues is called flux-creep: when there is a gradient in the magnetic field, the thermally activated "creep" of flux between pinning sites is accelerated until the gradient is removed. Practically, in bearings that rely on the HTS materials for levitation, this means that there is a finite time that the system can remain operational before it needs to be warmed up and cooled back down. The time is reduced in cases where the HTS must provide a significant amount of lifting force. The second issue that at least some conventional HTS bearings have is a limited load-bearing capacity due to the way in which the HTS and magnets are arranged, only partially utilizing permanent magnets for lift and relying on HTS for the rest. Because of these issues, a relatively large mass of HTS is typically required, which then requires a large amount of cooling power, outweighing the benefit of passive stabilization. There is a need in the art for improved bearing and flywheel systems and methods.

BRIEF SUMMARY OF THE INVENTION

This disclosure provides a superconductor-magnet bearing system that can include first and second bearing portions movably coupled with one another. One of the first and second portions can be at least partially composed of one or more high-temperature superconductor ("HTS") materials. Another of the first and second portions can be at least partially composed of one or more magnets or other magnetic materials. An HTS bearing portion, or a bearing portion comprising HTS, also can include one or more magnets or other magnetic materials.

A superconductor-magnet bearing system can include a first bearing portion coupled to a support, which can be a first bearing portion having an outside dimension and an outer surface. The first bearing portion can, but need not, be fixed relative to the support. The first bearing portion can include an opening and an inner surface, such as an opening having a dimension larger than an outside dimension of a second bearing portion. One of the first and second bearing portions can be at least partially composed of a high-temperature superconductor and another of the first and second bearing portions can be at least partially composed of a magnet or other magnetic material. A second bearing portion can be disposed at least partially within the opening of the first bearing portion. A gap can exist between a surface of the first bearing portion and a surface of the second bearing portion.

A system can include a cooling system having a cooling assembly coupled to an HTS bearing portion. A cooling assembly can comprise a cryostat and a bearing portion can be at least partially disposed in the cryostat. At least a portion of a cooling assembly can be disposed in a gap or other space between a first bearing portion and a second bearing portion. A cooling system can include an interface portion configured for thermal communication, which can be disposed in communication with one or more bearing portions. Two or more bearing portions can be movably coupled to one another, which can include flux pinning and/or one or more other manners of coupling. One bearing portion can be adapted to rotate about another bearing portion. A gap or other space between bearing portions can be at least substantially uniform, and first and second bearing portions can be adapted so that a gap remains at least substantially uniform during movement of one or more bearing portions. At least one bearing portion can include a plurality of sections, segments, pieces or other bearing portions.

An HTS bearing portion can include one or more magnets, and a magnet bearing portion can include one or more magnets in addition to one or more other portions. A system can include one or more active or passive control systems, sensing systems, cooling systems or other systems. A method can include one or more methods of forming, assembling, making, using, implementing and/or operating one or more superconductor-magnet bearing systems or portions of any of them. A method can include cooling one or more superconductor-magnet bearing systems or portions of any of them. A method can include coupling one or more superconductor-magnet bearing portions in a stable relationship and configuring at least one bearing portion to support a load. A method can include forming a bearing portion from a plurality of magnetic rings or other annular portions and coupling the bearing portion to an HTS bearing portion. A method can include controlling a relationship between two or more bearing portions using a magnetic control system, which can include an electromagnetic control system.

In at least one embodiment, a bearing and flywheel system can include a first bearing portion having an opening of a first dimension there through and a central longitudinal axis, a second bearing portion having a second dimension, the second dimension being smaller than the first dimension, and a flywheel coupled to the second bearing portion. One of the first and second bearing portions can be at least partially composed of a high-temperature superconductor and a first magnet. Another of the first and second bearing portions can be at least partially composed of a second magnet and a third magnet. The second bearing portion can be disposed at least partially within the opening through the first bearing portion. A gap can exist between an outer surface of the second bearing portion and an inner surface of the first bearing portion. The second bearing portion can be configured to rotate about the central longitudinal axis of the first bearing portion relative to the first bearing portion.

In at least one embodiment, the first bearing portion can be configured to repel the second bearing portion so that the second bearing portion is biased toward the central longitudinal axis. For example, the HTS can be configured to repel the second magnet so that the second bearing portion is biased toward a concentric position about the central longitudinal axis. In at least one embodiment, the first magnet can be configured to repel the third magnet and the second bearing portion can be biased toward a concentric position about the central longitudinal axis.

In at least one embodiment, the HTS and the second magnet can be configured to at least partially resist longitudinal and/or radial movement of the second bearing portion. In at least one embodiment, the HTS and the second magnet can have exterior surfaces that are disposed parallel to one another and parallel to the central longitudinal axis.

In at least one embodiment, the first magnet and the third magnet can be configured to at least partially resist longitudinal and/or lateral movement of the second bearing portion. In at least one embodiment, the first magnet and the third magnet can have exterior surfaces that are disposed parallel to one another and at an angle relative to the central longitudinal axis.

In at least one embodiment, the system can further include a fourth magnet coupled to one of the first and second bearing portions and a fifth magnet coupled to the other of the first and second bearing portions. The fourth magnet and the fifth magnet can be configured to repel one another, and thereby at least partially resist longitudinal and/or lateral movement of the second bearing portion relative to the first bearing portion. The fourth magnet and the fifth magnet can have exterior surfaces that are disposed parallel to one another and at an angle relative to the central longitudinal axis.

5

For example, the first magnet and the third magnet can have exterior surfaces that are disposed parallel to one another and at a first angle relative to the central longitudinal axis and the fourth magnet and the fifth magnet can have exterior surfaces that are disposed parallel to one another and at a second angle relative to the central longitudinal axis. The first and second angles can be equal and/or opposite. In at least one embodiment, the first and second angles are complimentary. In at least one embodiment, the first and second angles are different.

In at least one embodiment, at least one of the first, second and third magnets can be an annular magnet. The annular magnet can comprise a plurality of magnet segments.

In at least one embodiment, the flywheel can be a laminar flywheel comprising sheets, rings, or other layers of a first material and sheets, rings, or other layers of a second material. In at least one embodiment, the layers alternate, such that the first material layers and the second material layers are coupled together with one of the second material layers disposed between adjacent ones of the first material layers. In at least one embodiment, the first material layers can be configured to fail independently from failure of any other of the first material layers. In at least one embodiment, the first and second materials alternate in concentric rings. In at least one embodiment, the first and second materials alternate along the longitudinal axis.

In at least one embodiment, the second material has a higher tensile strength than the first material. In at least one embodiment, the second material can be configured to reinforce and/or prevent failure of the first material.

In at least one embodiment, the second material can be a phase change material. For example, the second material can have a higher tensile strength than the first material in a first phase and a lower tensile strength than the first material in a second phase. In at least one embodiment, the second material can be configured to selectively decouple the first material layers from each other and/or the second bearing portion.

In at least one embodiment, the system can include a shaft coupled between or otherwise coupled to the flywheel and the second bearing portion and a phase change material coupled between the flywheel and the shaft. The phase change material can be configured to selectively decouple the flywheel from the shaft.

In at least one embodiment, the flywheel can be a porous flywheel comprising a porous flywheel body having a radially exterior surface and a matrix of internal pores. In at least one embodiment, an annular disc can be coupled to the radially exterior surface of the flywheel body. In at least one embodiment, a plurality of structural support members can be coupled to the flywheel body. The structural support members can be oriented radially outwardly from a central longitudinal axis of the flywheel body. In at least one embodiment, a mass distribution material can be sealed within the matrix of pores of the flywheel body.

In at least one embodiment, the system can further include a flywheel shaft coupled between the flywheel and the second bearing portion. In at least one embodiment, the shaft can be split into a first shaft portion with a fourth magnet and a second shaft portion with a fifth magnet. In at least one embodiment, the fourth magnet can be disposed adjacent a first end of the flywheel. In at least one embodiment, the fifth magnet can be disposed adjacent a second end of the flywheel. In at least one embodiment, the fourth magnet and the fifth magnet can be attracted to one another and thereby configured to couple the flywheel to the flywheel shaft.

DETAILED DESCRIPTION OF THE INVENTION

Figure 1:
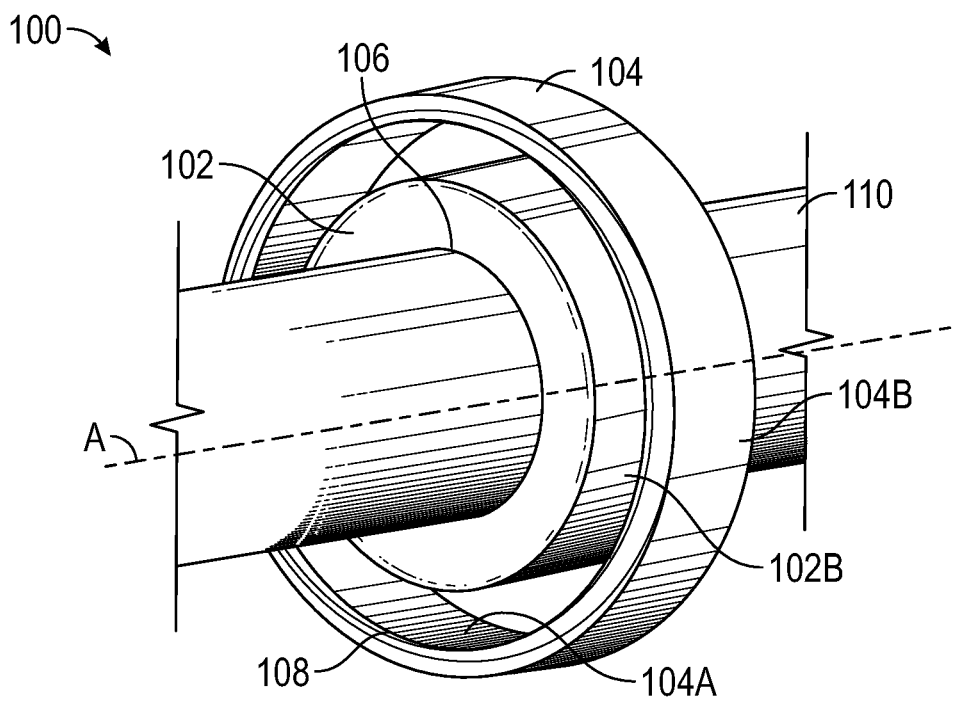
FIG. 1 illustrates an isometric view of one of many embodiments of a bearing system according to the disclosure.

The Figures described above and the written description of specific structures and functions below are not presented to limit the scope of what Applicant has invented or the scope of the appended claims. Rather, the Figures and written description are provided to teach any person ordinarily skilled in the art to make and use the invention for which patent protection is sought. Those skilled in the art will appreciate that not all features of a commercial embodiment of the disclosure are described or shown for the sake of clarity and understanding. Persons of skill in this art will also appreciate that the development of an actual commercial embodiment incorporating aspects of the present disclosure will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location, and from time to time. While a developer's efforts might be complex and time-consuming in an absolute sense, such efforts would be, nevertheless, a routine undertaking for those of ordinary skill in this art having benefit of this disclosure. It must be understood that the inventions disclosed and taught herein are susceptible to numerous and various modifications and alternative forms. Lastly, the use of a singular term, such as, but not limited to, "a," is not intended as limiting of the number of items. Also, the use of relational terms, such as, but not limited to, "top," "bottom," "left," "right," "upper," "lower," "down," "up," "side," and the like are used in the written description for clarity in specific reference to the Figures and are not intended to limit the scope of the inventions or the appended claims. When referring generally to such elements, the number without the letter is used. Further, such designations do not limit the number of elements that can be used for that function. Identifiers such as, but not limited to, "first," "second," "third," etc., are likewise used in the written description for clarity and are not intended to be limitative unless otherwise expressly indicated. For example, a "first" bearing portion can be a rotor and a "second" bearing portion can be a stator, or vice versa, depending on, e.g., an implementation of the disclosure and/or how any such bearing portion is otherwise limited in a claim(s).

The terms "couple," "coupled," "coupling," "coupler," and like terms are used broadly herein and can include any method or device for securing, binding, bonding, fastening, attaching, joining, inserting therein, forming thereon or therein, communicating, or otherwise associating, for example, mechanically, magnetically, electrically, chemically, operably, directly or indirectly with intermediate elements, one or more pieces of members together and can further include without limitation integrally forming one functional member with another in a unity fashion. The coupling can occur in any direction, including rotationally. The terms "including" and "such as" are illustrative and not limitative. The term "can" as used herein means "can, but need not" unless otherwise indicated. Each structure, component and other item included herein will have certain inherent physical characteristics when and if present in one or more physical embodiments of the present inventions, such as dimension(s) (e.g., height, width, length, diameter), mass, weight, imaginary axes, cross-sections and the like. It will be understood by a person of ordinary skill in the art that such characteristics are present, and that such items exist in one or more environments, regardless of whether expressly described or mentioned herein. The terms "reduced-friction," "low-friction" and similar terms as used herein refer generally to exhibiting or being subject to less friction than a conventional system (e.g., roller bearings) of similar application, such as a system that does not include high-temperature superconductor ("HTS") materials.

This disclosure provides an at least reduced-friction bearing system for supporting low-friction movement of one or more components, such as a flywheel. A bearing system can include one or more bearing portions and, in at least one embodiment, one or more bearing portions can include one or more bearing sections. One bearing portion can move relative to the other bearing portion, such as by rotating there about or otherwise relative thereto. At least one bearing portion can support a load and at least one bearing portion can include or otherwise be coupled to one or more supports. In at least one embodiment, the bearing sections can be oriented at various angles relative to an adjacent section(s). At least one bearing system according to the disclosure can support low-friction movement in a variety of applications, such as in a flywheel assembly.

A superconductor-magnet bearing system can include a first bearing portion and a second bearing portion. One of the first and second bearing portions can be at least partially composed of a high-temperature superconductor (HTS) and another can be at least partially composed of a magnet. The first bearing portion can be disposed at least partially within an opening of the second bearing portion with a gap between the first and second portions. A magnetic bearing portion can include a plurality of rings disposed next to one another. An HTS bearing portion can include a magnet. The bearing portions can be biased toward an alignment with one another. On bearing portion can rotate relative to another bearing portion.

In at least one embodiment, a bearing and flywheel system can include a first bearing portion having an opening of a first dimension there through and a central longitudinal axis, a second bearing portion having a second dimension, the second dimension being smaller than the first dimension, and a flywheel coupled to the second bearing portion. The bearing portions can be composed of HTS and/or magnets. The second bearing portion can be disposed at least partially within the opening through the first bearing portion. A gap can exist between an outer surface of the second bearing portion and an inner surface of the first bearing portion. The second bearing portion can be configured to rotate about the central longitudinal axis of the first bearing portion (and/or another axis) relative to the first bearing portion. In such an embodiment, which is but one of many, the second bearing portion can be a rotor and the first bearing portion can be a stator. However, this need not be the case and, in at least one embodiment, the second bearing portion can be a stator and the first bearing portion can be a rotor.

In at least one embodiment, the first bearing portion can be configured to repel the second bearing portion so that the second bearing portion is biased toward the central longitudinal axis. For example, the HTS can be configured to repel the second magnet so that the second bearing portion is biased toward a concentric position about the central longitudinal axis. In at least one embodiment, the first magnet can be configured to repel the third magnet so that the second bearing portion is biased toward a concentric position about the central longitudinal axis.

In at least one embodiment, the HTS and the second magnet and/or the first magnet and the third magnet can be configured to at least partially resist longitudinal and/or lateral movement of the second bearing portion. In at least one embodiment, the HTS and the second magnet and/or the first magnet and the third magnet can have exterior surfaces that are disposed parallel to one another and parallel to the central longitudinal axis.

In at least one embodiment, the system can further include a fourth magnet coupled to one of the first and second bearing portions and a fifth magnet coupled to the other of the first and second bearing portions. The fourth magnet and the fifth magnet can be configured to repel one another, and thereby at least partially resist longitudinal and/or lateral movement of the second bearing portion relative to the first bearing portion. The fourth magnet and the fifth magnet can have exterior surfaces that are disposed parallel to one another and at an angle relative to the central longitudinal axis. For example, the first magnet and the third magnet can have exterior surfaces that are disposed parallel to one another and at a first angle relative to the central longitudinal axis and the fourth magnet and the fifth magnet can have exterior surfaces that are disposed parallel to one another and at a second angle relative to the central longitudinal axis. Any of the magnets can be unitary or can be comprised of two or more magnet portions, as required or desired for a particular physical implementation of the disclosure.

In at least one embodiment, the flywheel can be a laminar flywheel comprising one or more sheets, rings, or other layers of a first material and one or more sheets, rings, or other layers of a second material. In at least one embodiment, the layers alternate, such that the first material layer(s) and the second material layer(s) are coupled together, which can include one of the second material layer(s) being disposed between adjacent ones of the first material layers (i.e., if two or more first material layers are present). In at least one embodiment, the first material layers can be configured to fail independently from failure of any other of the first material layers. In at least one embodiment, the first and second materials alternate in concentric rings. In at least one embodiment, the first and second materials alternate along the longitudinal axis.

In at least one embodiment, the second material can be a phase change material. For example, the second material can have a higher tensile strength than the first material in a first phase and a lower tensile strength than the first material in a second phase. In at least one embodiment, the second material can be configured to selectively decouple the first material layers from each other and/or the second bearing portion. In at least one embodiment, the system includes a shaft coupled between the flywheel and the second bearing portion and a phase change material coupled between the flywheel and the shaft. The phase change material can be configured to selectively decouple the flywheel from the shaft.

In at least one embodiment, the flywheel can be a porous flywheel comprising a porous flywheel body having a radially exterior surface and a matrix of internal pores. In at least one embodiment, an annular disc or other barrier, such as a strip or wall, can be coupled to the radially exterior surface of the flywheel body for sealing the pores. In at least one embodiment, a plurality of structural support members can be coupled to the flywheel body. The structural support members can be oriented radially outwardly from a central longitudinal axis of the flywheel body. In at least one embodiment, a mass distribution material can be sealed within the matrix of pores of the flywheel body.

In at least one embodiment, the system can include a flywheel shaft, which can include one or more shaft portions and which can be coupled to and/or part of one or more bearings or bearing portions. In at least one embodiment, a flywheel shaft can be coupled between or otherwise coupled to a flywheel and a second bearing portion, such as a rotor bearing portion. In at least one embodiment, the shaft can include a first shaft portion with a magnet(s) and a second shaft portion with a magnet(s). In at least one embodiment, one magnet can be disposed adjacent a first end of the flywheel and another magnet can be disposed adjacent a second end of the flywheel. The magnets can be attracted to one another and can be configured to couple the flywheel to the flywheel shaft by disposing or sandwiching at least a portion of the flywheel between the magnets.

Figure 2:
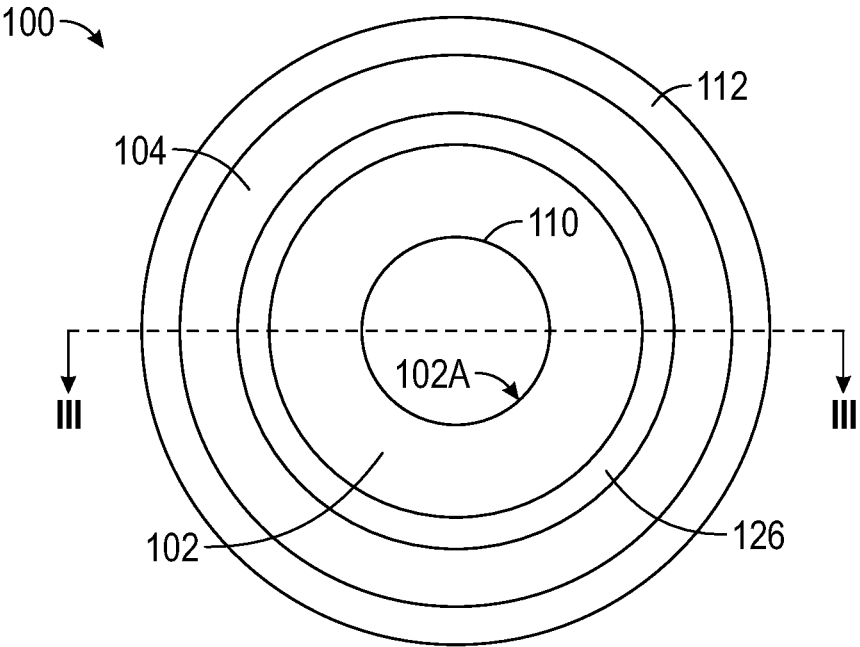
FIG. 2 is a side schematic view of the embodiment of FIG. 1.
Figure 3:
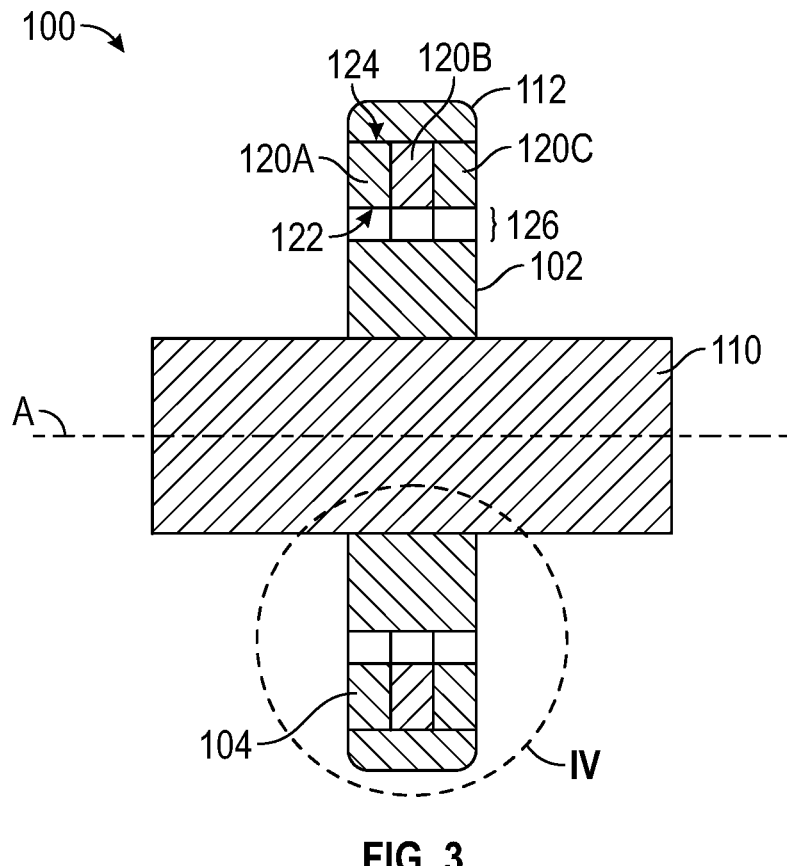
FIG. 3 is a cross-sectional top schematic view of the embodiment of FIGS. 1-2.
Figure 4:
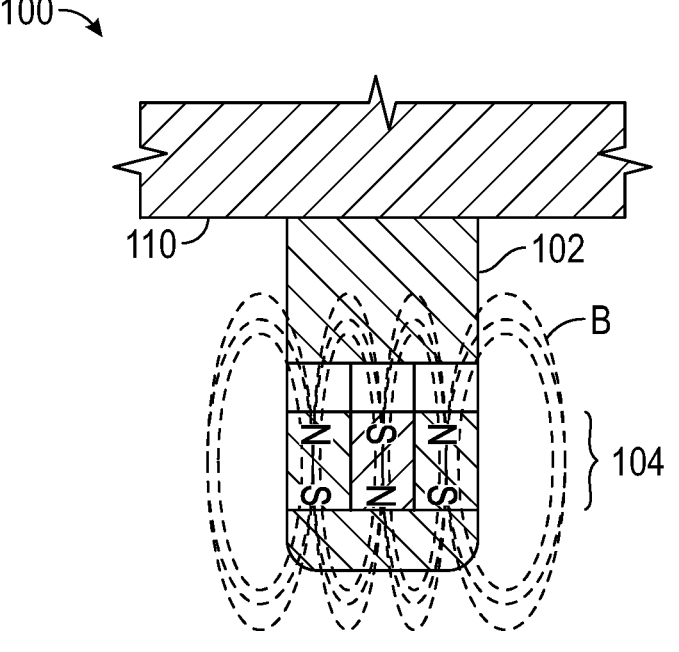
FIG. 4 is a detail schematic view of a portion of FIG. 3.
Figure 5:
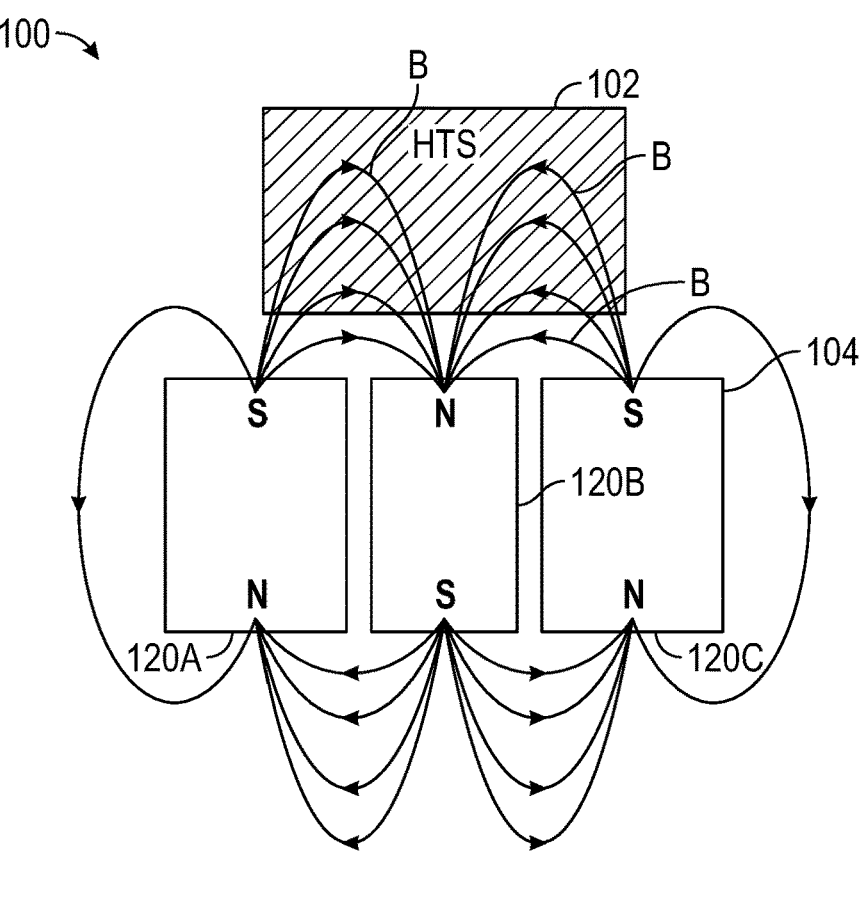
FIG. 5 is a partial cross-sectional schematic view of another of many arrangements of the embodiment of FIGS. 1-4 according to the disclosure.
Figure 6:
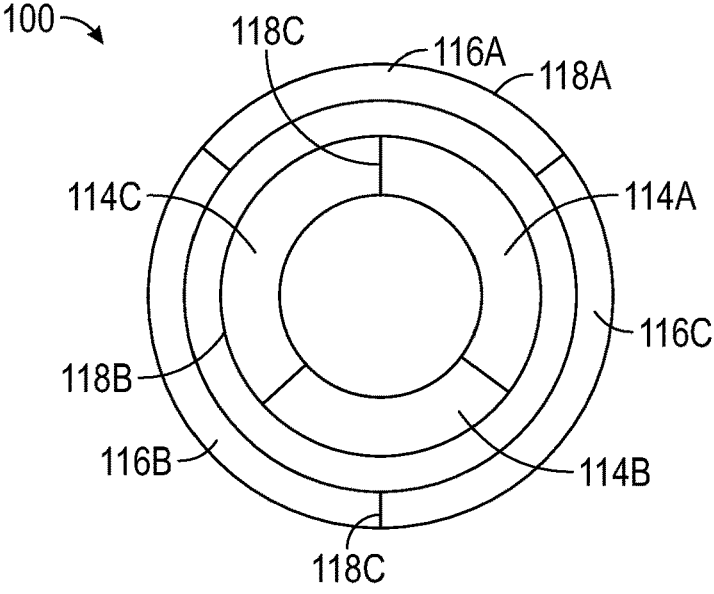
FIG. 6 illustrates a side schematic view of another of many embodiments of a bearing system according to the disclosure.
Figure 6A:
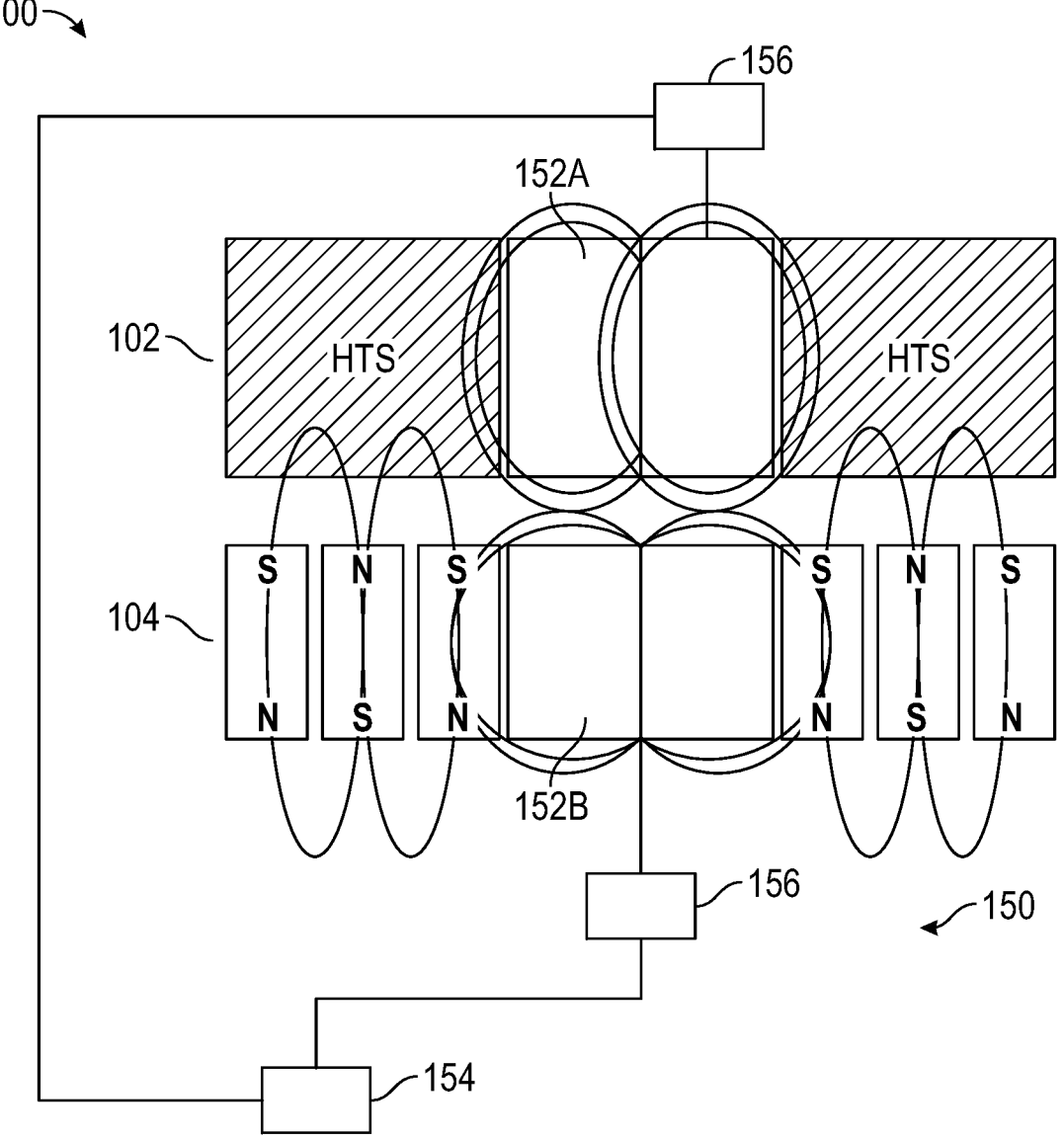
FIG. 6A is a partial cross-sectional schematic view of one of many embodiments of a bearing system having a control system according to the disclosure.
Figure 7:
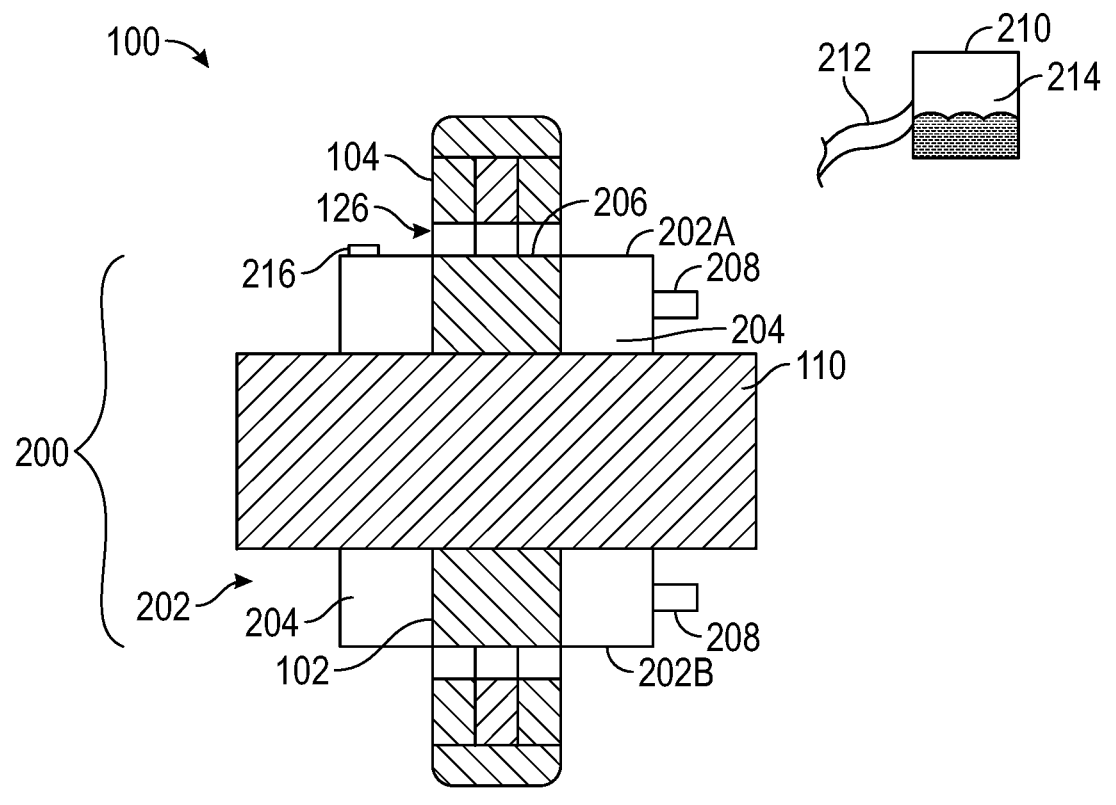
FIG. 7 illustrates a cross-sectional view of one of many embodiments of a bearing system having a cooling system according to the disclosure.
Figure 8:
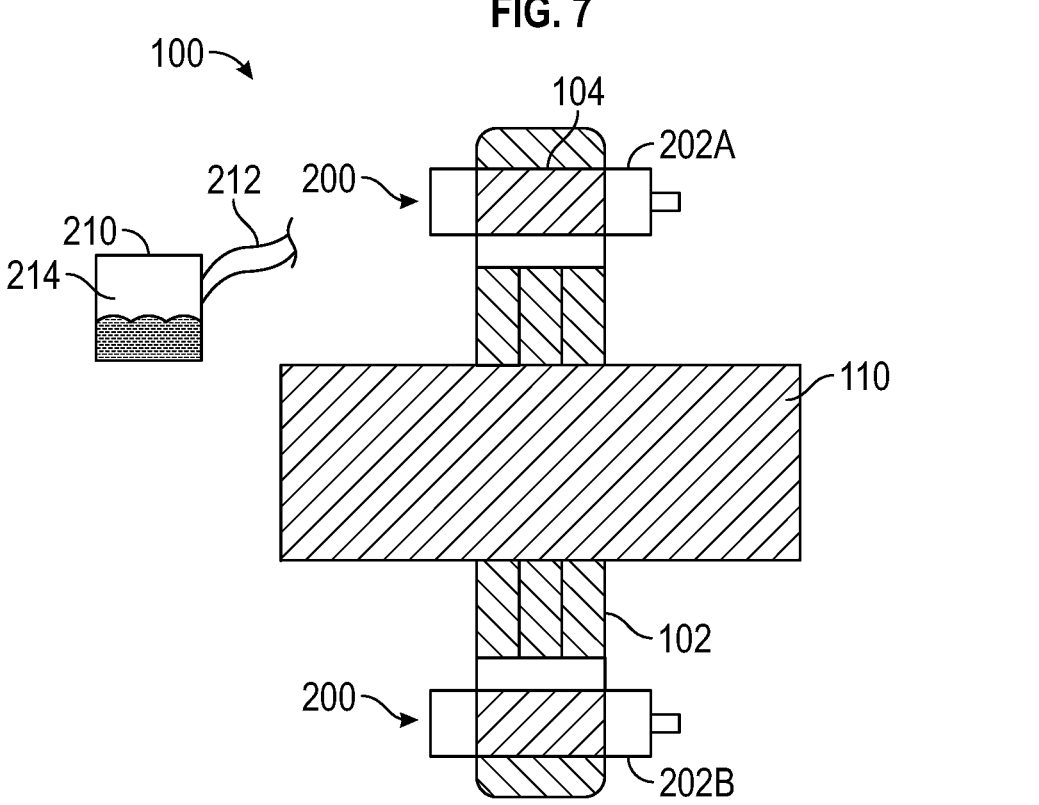
FIG. 8 illustrates a cross-sectional view of another of many embodiments of a bearing system having a cooling system according to the disclosure.

FIG. 1 illustrates an isometric view of one of many embodiments of a bearing system according to the disclosure. FIG. 2 is a side schematic view of the embodiment of FIG. 1. FIG. 3 is a cross-sectional top schematic view of the embodiment of FIGS. 1-2. FIG. 4 is a detail schematic view of a portion of FIG. 3. FIG. 5 is a partial cross-sectional schematic view of another of many arrangements of the embodiment of FIGS. 1-4 according to the disclosure. FIG. 6 illustrates a side schematic view of another of many embodiments of a bearing system according to the disclosure. FIG. 6A is a partial cross-sectional schematic view of one of many embodiments of a bearing system having a control system according to the disclosure. FIG. 7 illustrates a cross-sectional view of one of many embodiments of a bearing system having a cooling system according to the disclosure. FIG. 8 illustrates a cross-sectional view of another of many embodiments of a bearing system having a cooling system according to the disclosure. FIGS. 1-8 will be described in conjunction with one another.

Bearing system 100 can include a plurality of bearing portions for supporting motion relative to one another, such as a first bearing portion 102 and a second bearing portion 104. First bearing portion 102, second bearing portion 104 and one or more other bearing portions may be referred to herein as "bearing portion" or simply "portion" followed by a corresponding reference numeral (e.g., "portion 102") for purposes of convenience and brevity. Bearing portions 102, 104 can be rotationally coupled to one another for allowing one portion to rotate relative to the other portion, as further described below. First and second portions 102, 104 can be cylindrical, which can include having a circular cross-sectional shape, or other cross-sectional shape, such as polyhedral. One or more of first and second portions 102, 104 can, but need not, be annular, ring shaped or tubular. For example, as shown in FIGS. 1-2 for illustrative purposes, first and second portions 102, 104 can have openings 106, 108 there through, respectively, such as central openings or holes. However, this need not be the case and, for example, portion 102 need not have an opening there through. Rather, portion 102 can have a solid cross-section, which can include being disk- or puck-shaped. First and second portions 102, 104 can be disposed about an axis A, such as a central longitudinal axis or other axis, which can be any axis required by a particular application, including an axis about which one or more of the bearing portions can rotate. Bearing portion 104 can have inner and outer surfaces, such as inside surface 104A and outside surface 104B. Similarly, portion 102 can have inner and outer surfaces (e.g., in an embodiment wherein portion 102 is annular), such as an inside surface 102A (see FIG. 2) and an outside surface 102B.

System 100 can include one or more supports 110 for holding or otherwise supporting one or more of first and second bearing portions 102, 104. For example, a bearing portion can be coupled to a support for at least partially supporting the respective bearing portion, separately or in combination with one or more other components. In at least one embodiment, which is but one of many, support 110 can be a shaft, rod, tube or other support (e.g., as described elsewhere herein), such as an axle, and bearing portion 102 can be coupled thereto. Portion 102 can be coupled to one or more supports, such as support 110, in any manner required by a particular application, which can, but need not, include the use of one or more couplers, such as fasteners, adhesives, or other couplers for holding one or more components in position. Alternatively, or collectively, portion 102 can be coupled to support 110 apart from the use of fasteners, including being force-fit thereto or formed integrally therewith, in whole or in part. With continuing reference to FIGS. 1-8, and specific reference to FIGS. 2-3, system 100 can include a housing 112 for at least partially covering or otherwise supporting one or more bearing portions. For example, housing 112 can be coupled to an outer portion of bearing portion 104, which can include at least a portion of outer surface 104B. In at least one embodiment, such as one or more of the embodiments described in further detail below, housing 112 can be or include one or more resilient members or other components for communicating or cooperating with other portions of a movement system, such as a transport or transportation system. For example, in at least one embodiment, which is but one of many, bearing system 100 can be at least a portion of a wheel assembly, wherein bearing portion 104 can be coupled to (including forming a portion of) a wheel and housing 112 can be or include a tire coupled to the wheel. In such an embodiment, bearing portion 104 and/or housing 112 can be configured to communicate with a supporting surface, such as a road or track, for movement there along. For example, outer surface 104B of bearing portion 104 (and housing 112, if present) can include a groove or notch for moving along a track, although this need not be the case and, alternatively, these components can be flat, curved, contoured or any other shape required by a particular application.

As illustrated, for example, in FIGS. 1-2 for exemplary purposes, bearing portions 102, 104 can, but need not, be annular and each can be comprised of a single body. However, this need not be the case and, alternatively, one or more of bearing portions 102, 104 can include one or more sub-portions, such as segments, sections or pieces, disposed relative to one another to form or approximate a ring or similar shape (see FIG. 6). For example, bearing portion 102 can include a plurality of sub-portions 114A, 114B, 114C ( . . . 114n) (collectively referred to as sub-portions 114), and bearing portion 104 can include a plurality of sub-portions 116A, 116B, 116C ( . . . 116n) (collectively referred to as sub-portions 116). If comprised of sub-portions in accordance with a particular embodiment, a bearing portion 102, 104 can include any number of sub-portions 114, 116, such as two, three, up to several dozen, or more. The number of sub-portions, if present, can depend on any number of implementation-specific factors, such as, for example, the availability of radially magnetized annular rings, the costs/benefits of using integral annular rings versus two or more ring segments or other portions, or other considerations. For instance, it can be time intensive and/or expensive to radially magnetize an integral ring and it can in at least one embodiment be easier and/or cheaper to approximate a radially magnetized annular ring by using arc segments that are approximately radially magnetized or a plurality of flat or otherwise shaped magnets arranged in the shape of a polyhedral that approximates a circle or ring shape. The segments or other portions can be magnetized, such as in the same radial direction, to form or approximately form one or more rings (a plurality of which can comprise system 120, or a bearing portion 102, 104, for example). Further, the sub-portions can be coupled to one another, such as by being disposed adjacent to one another (with or without a gap or other material there between), in any manner required by a particular application, which can, but need not, include the use of one or more couplers 118A, 118B, 118C (collectively referred to as coupler 118) for coupling one or more sub-portions to one another. Coupler 118 can be or include any type of coupler(s) required by a particular application, and can be coupled to two or more sub-portions in any manner, such as, for example, to the interior, exterior, or side of the sub-portions, separately or in combination. In at least one embodiment, which is but one of many, coupler 118 can include a substrate or substratum coupled along one or more sides of a plurality of adjacent sub-portions, which can, but need not, include a substrate coupled on both the inner and outer portions or surfaces of such sub-portions. Alternatively, or collectively, coupler 118 can include one or more couplers or portions thereof disposed between adjacent segments (e.g., couplers 118C).

With continuing reference to FIGS. 1-8, the composition and coupling of first and second bearing portions 102, 104 will now be described in further detail. Generally speaking, one of first and second bearing portions 102, 104 can be at least partially comprised of a superconductor, such as a high-temperature superconductor (aka "HTS" or "high-Tc") material, while the other of first and second bearing portions 102, 104 can be at least partially comprised of a magnetized material or magnet. For example, inner bearing portion 102 can include one or more HTS portions and outer bearing portion 104 can include one or more magnets. As another example, inner bearing portion 102 can include one or more magnets and outer bearing portion 104 can include one or more HTS portions. The terms "inner" and "outer" are used herein to refer to one or more of the exemplary embodiments (which are some of many) shown in the appended Figures for purposes of convenience and explanation and are not intended to be limitative. For example, in the exemplary embodiment of FIG. 1, bearing portion 102 may be referred to as the inner portion while bearing portion 104 may be referred to as the outer portion. Similarly, as described elsewhere herein, certain bearing portions (which can include any bearing portion) may include HTS material while other bearing portions (which can include any other bearing portion) may include one or more magnets (or magnetic material(s)); consequently, such portions respectively may be referred to herein as "HTS bearing portions" and "magnet (or magnetic) bearing portions" for convenience and clarity of purpose. An HTS bearing portion can be formed uniformly from a single HTS material, but need not be, and can alternatively be formed from a plurality of HTS materials in combination with one another and/or with one or more non-HTS materials. Similarly, a magnetic bearing portion can be formed uniformly from a single magnet material, but need not be, and can alternatively be formed from one or more magnet materials in combination with one another and/or with one or more non-magnet materials. While the magnetic bearing portion can be formed, for example, from one or more permanent magnets (e.g., rare earth magnets, other ferromagnetic materials, etc.), it need not be, and can alternatively be or include one or more electromagnets, separately or in combination with the permanent magnet(s).

System 100 can include bearing portions (e.g., first and second bearing portions 102, 104) comprising any type of HTS material suitable for a particular application, whether now known or developed in the future. For example, it is envisioned that materials capable of superconductive properties at higher (relative to presently known materials) transition temperatures may come to be known in the future, one or more of which may be suitable for utilization in at least one embodiment of the present disclosure. For instance, a material exhibiting superconductive properties at or near room or atmospheric temperature (e.g., in the range of about 0° F. to about 100° F.) could be useable for one or more embodiments of the present disclosure, considering of course one or more other implementation-specific factors such as mechanical properties or other factors that would be understood by a person of ordinary skill in the art having the benefits of the present disclosure. Examples of known HTS materials suitable for use in one or more embodiments of the present disclosure include, but are not limited to, Type II superconductors such as copper-oxide superconductors including $HgBa_2Ca_2Cu_3O_x$, $Bi_2Sr_2Ca_2Cu_3O_{10}$ (BSCCO) and $YBa_2Cu_3O_{(7-x)}$ (Yttrium-Barium-Copper-Oxide or YBCO), as well as iron-based superconductors including SmFeAs(O,F), CeFeAs(O,F) and LaFeAs(O,F). YBCO, for example, can be considered one of the most widely available and commonly used HTS materials at present. However, at least one embodiment of the present disclosure can include any superconductor having flux-pinning properties as described elsewhere herein. A specific type of YBCO known as "melt-textured" YBCO can be useful for some applications of the present inventions, for example, because it can allow the domains of the material to be oriented along the same direction, which can allow for relatively higher (relative to some other HTS materials) levitation forces in some circumstances. In this process, after YBCO is prepared, it is melted again with a "seed" material placed on it to direct the rest of the material (e.g., single crystals of MgO or $Sm_{123}$ can be used). An example of a process to synthesize melt-textured YBCO can be found in available literature (see, e.g., Litzkendorf, D. et al. Batch-processing and bonding of melt-textured applications YBCO for motor. 5107, 1-4 (1998)). Briefly, a commercial pre-reacted $YBa_2Cu_3O_{(7-x)}$ powder with an excess $Y_2O_3$ can be used. These materials can be mixed homogenously, such as with uniaxial pressing into cylindrical blocks. The blocks can be heated inside of furnaces using a melt-growth process (e.g., using a "seed" material as mentioned above), cooled down slowly, and finally oxygenated in a separate procedure. Alternatively, superconductors can be produced in differently shaped blocks, for example bars or other blocks having cross-sectional shapes such as square, rectangular, oval or oblong, among others. The lifetime of HTS can depend on the environment that it is in, and one or more conditions can lead to HTS degradation over time. For example, YBCO can react with the water, so humidity in the atmosphere or another environment can lead to the degradation of YBCO, such as when the humidity is greater than 40% (see, e.g., Roa, J. J. et al. Surface & Coatings Technology Corrosion induced degradation of textured YBCO under operation in high humidity conditions. *Surface & Coatings Technology* 206, 4256-4261 (2012)). However, even in such a case, the surface of a block of HTS can degrade prior to an internal portion, which can lead to the formation of a barrier that can slow down degradation of the remaining material. In an application such as levitation, for example, the properties of the bulk material can be more important than the surface, although this need not always be the case. In one study, YBCO exposed to water was observed to lose approximately 12.5% levitation force twenty hours after synthesis, but then to remain constant (see Sriram, M. A., Ponce, L. & Murr, L. E. Modeling superconductor degradation using magnetic levitation. *Applied Physics Letters* 58, 1208-1210 (1991)). Additionally, in this study they did not see any observable degradation of YBCO that was not exposed to humidity for a period of over a month (Id.). In order to help ensure the long time usefulness of the material, it can be protected from air and humidity, as described in further detail below. As another example, HTS materials can degrade when oxygen diffuses out of the material. In other words, the amount of oxygen in an HTS material can be important to the super-conducting properties, so when oxygen diffuses out the material can become less superconductive over time. Oxygen can diffuse out more quickly when the material is heated up to relatively high temperatures. When the material is at relatively low temperatures (as presently can be needed for YBCO to be superconducting), the diffusion of oxygen out of the material can be at least partially suppressed (see, e.g., Truchlý, M. et al. Studies of YBa2Cu3O6+x degradation and surface conductivity properties by Scanning Spreading Resistance Microscopy). Therefore, HTS degradation can be at least partially reduced, for example, in an environment that is both atmosphere-free (such as pure nitrogen or vacuum) and at relatively very low temperatures (such as that of liquid nitrogen). In the future, materials may be discovered which do not suffer (or at least suffer less) from one or more of the mentioned limitations. The HTS materials mentioned herein and other HTS materials can be used separately or in combination, whether with one another or with one or more other materials, as required by a particular application of the present disclosure.

Furthermore, system 100 can include bearing portions (e.g., first and second bearing portions 102, 104) comprising any type of magnet (e.g., magnetic or magnetized material) suitable for a particular application, whether now known or developed in the future. Examples of known magnets suitable for use in one or more embodiments of the present disclosure include, but are not limited to $Nd_2Fe_{14}B$ (Neodymium magnets) and $SmCo_5$ (Samarium-Cobalt alloy magnets). Other examples can include magnets made from alloys of iron with nickel, cobalt and/or aluminum, or other materials, such as titanium, copper and/or niobium, among others. Alternatively, or collectively, one or more electromagnets can be used. In an embodiment wherein the magnetic bearing portion is annular or similarly shaped (which can be either of bearing portions 102, 104, as explained in further detail elsewhere herein), the bearing portion (or one or more rings thereof) can be continuous or alternatively can be comprised of multiple segments, arcs or other sub-pieces. In the latter case, it can be advantageous in at least some embodiments for the segmented portion to approximate an unsegmented structure as closely as is practicable under the circumstances (considering factors such as cost, material availability, size, application, etc.), which can at least partially reduce a potential for non-uniformity of the radial magnetic field in the circumferential direction, and thus for resistance against rotation. However, this need not be the case, and varying magnitudes of resistance can be acceptable in one or more other embodiments or applications of Applicant's disclosure.

Turning to the coupling of the bearing portions, first and second bearing portions 102, 104 can be coupled to one another by way of magnetic communication between the HTS bearing portion (one of first and second bearing portions 102, 104) and the magnet bearing portion (the other of first and second bearing portions 102, 104). Such communication can be at least partially based on the properties of high temperature superconductors and magnets and the manners in which these materials interact with one another. More specifically, two effects that can be utilized in the present disclosure include the Meissner effect and flux-pinning. The Meissner effect can be referred to as the repulsion of magnetic flux lines from within a superconductor upon cooling down through its superconducting transition temperature (Tc) or, said differently, an expulsion of a magnetic field from a superconductor during its transition to the superconducting state. Magnetic field can be expelled upon cooling through the $T_c$. For Type II superconductors, there can be two critical magnetic fields, or $H_{c1}$ and $H_{c2}$. If the magnetic field present in a particular application is less than $H_{c1}$, it can be possible that no magnetic field may penetrate into the superconductor. If the magnetic field is between $H_{c1}$ and $H_{c2}$, the magnetic field can penetrate through certain portions of the material. Beyond $H_{c2}$, superconductivity can be at least partially suppressed, which can result in the material no longer being in a superconducting state. The term "flux-pinning" can refer to an effect exhibited by Type II superconductors (including HTS materials). Magnetic flux can be defined as the component of a magnetic field passing through a particular surface. Flux-pinning can occur, for example in Type II superconductors, because there are regions of the HTS material that are not superconducting and other regions that are superconducting. Because magnetic flux can pass through the former (non-superconductive) regions, but not the latter (superconductive) regions, a magnet can effectively be "pinned" in place relative to a corresponding HTS structure. This "flux-pinning" effect can, for example, allow a superconductor to levitate over a magnet, or vice versa. The load bearing capacity of the levitated component can depend at least partially on the surface areas of the respective components, among other factors, such as the quality or type of HTS materials used, or the critical field ($H_{c2}$) or critical current density ($J_c$), both of which can vary based on the type of HTS material.

With continuing reference to FIGS. 1-4, at least one embodiment of the present disclosure can include a disk- or ring-shaped first bearing portion 102 and an annular second bearing portion 104 rotatably coupled to the first portion, as further described below. In at least one embodiment, which is but one of many, first portion 102 can be the HTS portion and second portion 104 can be the magnet portion, or vice versa, and second bearing portion 104 can be magnetically coupled to portion 102 with a gap 126, such as a uniform, non-uniform, fixed, variable or other space, there between. In at least one embodiment, gap 126 can be adapted to allow one bearing portion to rotate about the other bearing portion without physical contact between the bearing portions. The bearing materials can alternatively have shapes other than disks and rings, as explained elsewhere herein. First portion 102 can be an HTS portion and can, for example, be a ring shape (or other shape having one or more openings there through). In such an embodiment, which embodiment is but one of many, a support 110 can be coupled with first portion 102, which can include being disposed in opening 106, and can be adapted to support cooling of the bearing portion. For example, support 110 (e.g., an axle, spindle or other support) can be comprised at least partially of a heat-conductive material (e.g., copper, aluminum or another metal) and can be coupled in thermal communication with bearing portion 102 for removing heat there from. As another example, support 110 need not pass through bearing portion 102, and can be disposed partially therein or adjacent thereto while nonetheless remaining in a supporting and/or heat-transferring relationship. Portion 102 and support 110 can, but need not, be in direct contact with one another, and system 100 can include, for example, a heat transfer medium disposed at least partially there between (e.g., a heat transfer gel, gasket or other material).

As shown in FIGS. 3-4 for illustrative purposes, second bearing portion 104 can include a magnetic ring for coupling with an HTS first bearing portion 102 (alternatively, first bearing portion 102 can include a magnetic ring for coupling with an HTS second bearing portion 104). In at least one embodiment, which is but one of many, second bearing portion 104 (or first portion 102, as the case may be) can include a plurality of magnetic rings coupled to one another, such as 2, 3, 4, or up to 12 or more, which can include being disposed adjacently (whether or not in direct contact) to one another. As shown in the exemplary embodiment of FIGS. 3-4, bearing portion 104 (or portion 102; see, e.g., FIG. 8) can include three magnetic rings 120A, 120B, 120C (collectively, rings 120). However, this is just an example, and more or fewer rings can be used (including a single ring). Each ring 120 can be magnetized with one pole on a first side or surface, such as an inner surface 122, and one pole on a second side or surface, such as an outer surface 124. As explained elsewhere herein, in practice, one can alternatively magnetize multiple arc segments and couple them to at least approximate the magnetization of one or more of rings 120 (the term ring as used herein includes both unitary rings and segmented rings formed from a plurality of pieces, unless otherwise indicated). Rings 120 can be coupled to one another for creating a relatively large or increased gradient in the magnetic field in an axial direction, while maintaining a relatively uniform field in a circumferential direction, as illustrated, for example, by the magnetic flux lines B (simplified for purposes of clarity) shown in FIG. 4 (see also FIG. 5 described below). Variables such as gradient magnitude and field uniformity will of course be implementation specific, can vary from application to application, and can depend on any number of considerations according to an application, such as material types, magnet strength, magnet size, load bearing requirements, loading conditions, temperature and other factors (e.g., those discussed elsewhere herein), separately or in combination. The magnetic field uniformity of the magnets can be important, for example, because sharp gradients in a circumferential direction can cause a force in the HTS material that can effectively act like a friction (and hence be a source of energy loss), but rings 120 need not have perfect uniformity relative to one another. For example, at least one previous study has shown that even without a perfectly uniform magnetic field, the resulting torque due to the non-uniformity in the case of a superconductor-magnet interface is small and velocity independent (see Lee, E., Ma, K., Wilson, T. L. & Chu, W.-K. Superconductor-magnet bearings with inherent stability and velocity-independent drag torque. 1999 *IEEE/ASME International Conference on Advanced Intelligent Mechatronics* (1999)). Another study has looked into the effect of air gaps between magnets on the levitation force, and it found that for an air gap of 0.5 mm between the studied magnets, there is less than 1% variation in the levitation force at a levitation height of 15 mm. In other words, because the superconductor was separated by >10 mm from the surface of the magnets in the study, the superconductor did not easily "see" the magnetic field fluctuation in such a configuration (see Liu, M., Wang, S., Wang, J. & Ma, G. Influence of the Air Gap between Adjacent Permanent Magnets on the Performance of NdFeB Guideway for HTS Maglev System. *Journal of Superconductivity and Novel Magnetism* 21, 431-435 (2008)).

Turning back to the structure and arrangement of the present invention, system 100 can include a plurality of rings 120 arranged, for example, so that in an axial direction, the inner surfaces 122 are disposed N-S-N ("N" meaning north and "S" meaning south) and the outer surfaces 124 are disposed S-N-S (see, e.g., FIG. 4). As another example, rings 120 can be coupled so that inner surfaces 122 are disposed S-N-S and outer surfaces 124 are disposed N-S-N (see, e.g., FIG. 5). As illustrated by these two exemplary embodiments, which are but two of many, rings 120 can cooperate with one another to create a magnetic field gradient in an axial direction (i.e., in the horizontal direction as shown in FIG. 5) that at least partially resists or prevents axial movement of first and second bearing portions 102, 104 relative to one another (see, e.g., the simplified magnetic flux lines B of FIG. 5). Rings 120A and 120B (or "AB") and rings 120B and 120C (or "BC") can create respective forces in both directions (i.e., both left and right as shown in the exemplary embodiment of FIG. 5). When the HTS portion is moved (or subjected to a force that would tend to move it), for example, to the left (looking at FIG. 5), BC can bias or "pull" it back toward a central or other location relative to the magnet portion while AB can bias or "push" it back toward such location. Similarly, if the HTS portion is moved (or subjected to a force that would tend to move it) to the right (as shown in FIG. 5 for illustrative purposes), BC can "push" against such movement while AB can "pull" against such movement. This can occur because the HTS "wants" to maintain the same configuration of flux pinned within it. In other words, when the magnetic field moves relative to the HTS, the HTS can tend to move in a direction which can restore it to the previous configuration, such as a default configuration (e.g., it can go back to a central location over ring 120B in the case of FIG. 5). In this manner, the magnetic relationship of, for example, rings 120A and 120B, and rings 120B and 120C, respectively, can create forces that tend to bias bearing portion 104 toward a central (or other, as the case may be) position relative to bearing portion 102 (which is an HTS bearing portion in the example of FIG. 5), or vice versa.

Embodiments of the present disclosure alternatively can include other arrangements and numbers of rings. For example, system 100 can include a bearing portion 102, 104 having five rings with inner or outer surfaces in a S-N-S-N-S arrangement (the opposite surfaces being N-S-N-S-N) in an axial direction, or NSNSNSNSN (the opposite surfaces being SNSNSNSNS), etc., among others. As another example, rings 120 can be disposed in an arrangement known as a Halbach array, which can help enhance the magnetic field on one side of the magnets. Other arrangements also can be used. For example, rings 120 need not be arranged N-S-N-S-N, etc., and alternatively can be coupled or otherwise disposed in other arrangements for creating an axial magnetic field gradient and a circumferential field uniformity sufficient to support a particular application (which can include gradients and uniformities of any magnitude or character), such as, e.g., Up, Right, Down, Left, Up. In such a configuration, the directions can refer to the direction of the north or south pole of a magnet. For example, the exemplary embodiment of FIG. 5, which is but one of many, can be described as north up, north right, north down, north left, north up.

Due to the effects of magnetic flux pinning, in magnetic field arrangements such as those described above for rings 120 for exemplary purposes, bearing portion 104 can rotate or spin in a circumferential direction relative to bearing portion 102 (e.g., about axis A), but can resist displacement in an axial direction (e.g., along axis A). The Meissner effect can maintain a force between the HTS and the magnet(s) in a radial direction, which can prevent the first and second bearing portions from contacting one another, such as while under a load (e.g., in a load in a direction perpendicular to axis A). The Meissner effect can become stronger as the bearing portions get closer to one another (or are subjected to radial forces that would tend to move them closer to one another), which can at least partially counteract such forces, while the flux-pinning effect can effectively bias the bearing portions toward a concentric position as shown in the Figures. In at least one embodiment of the present disclosure, the surface areas of the magnet and HTS bearing portions can be maximized, which can at least help maximize a load-bearing capacity of the bearing system. Such maximizations are of course application-specific, and can depend on any number of factors, such as size constraints, materials and cost constraints, among others, such as material fabrication methods, as will be understood by a person of ordinary skill in the art having the benefits of the present disclosure.

One or more embodiments of the present disclosure, such as one or more of those described above, can remain stable under one or more perturbations, as described in further detail elsewhere herein. Such embodiments may not require active feedback, such as from one or more sensors coupled to a controller, although such control and feedback systems can be included in at least one embodiment of the present disclosure. For example, system 100 can include an active feedback or other control system 150 for monitoring or controlling one or more aspects of the system (see FIG. 6A). In such an embodiment, which is but one of many, one or more magnets, such as an annular magnet, can be embedded in or otherwise coupled to one or more bearing portions of the system (which could be any bearing portion, such as an HTS portion). A shown in FIG. 6A for exemplary purposes, a magnet (or plurality of magnets) 152A can be coupled to bearing portion 102 in such a way that it can interact repulsively with a magnet (or plurality of magnets) 152B in bearing portion 104. One or more of magnets 152A, 152B can be electromagnets, for example, and a repulsive interaction there between can be actively or otherwise modified by a controller 154, such as based on feedback or other data from one or more sensors 156 (e.g., pressure, voltage, current, magnetic field, force, temperature, or other sensors), separately or in combination. For example, control system 150 can be adapted to monitor and/or control one or more of magnets 152A, 152B (if present) based on one or more feedbacks, measurements or other inputs, such as for maintaining stability of the system. In at least one embodiment, a system 100 have a control system 150 can be adapted to modify the field strength of one or more of magnets 152A, 152B, such as, for example, to increase, decrease or otherwise control a load-bearing capacity or loaded configuration of the system. Of course, it will be understood that control system 150 need not be present in one or more other embodiments of the present disclosure, and that system 100 can include one or more magnets 152A, 152B separate and apart from control system 150.

As explained above, system 100 can include a housing 112 coupled to bearing portion 104. In at least one embodiment, which is but one of many, housing 112 can be a tire or other structure for contacting a surface or object for movement relative thereto. Housing 112 can be comprised of any material required by a particular application, such as rubber, metal, carbon fiber, plastic, nylon, or another material suitable for contact with a surface that will be contacted. Housing 112 and bearing portion 104 can be coupled in any manner required by a particular application, which can include being coupled to one another by way of fasteners, adhesives, or other couplers, separately or in combination. Housing 112 and portion 104 can be resiliently coupled together so as to remain coupled in applications wherein bearing portion 104 can be subjected to relatively high rotational velocities. For example, in an embodiment wherein system 100 is utilized in a wheel assembly (as further described below), at 100,000 RPM, the total force that can be required to hold together a 7 kg wheel (weight not including the HTS, which is stationary) can be roughly 700,000 pounds. However, a material such as carbon fiber can have an ultimate tensile strength of roughly 3.5 GPa (and a Young's modulus far surpassing that), which can correspond to roughly 500,000 PSI. In such an embodiment, therefore, a "tire" having a cross-sectional area of several square inches can be sufficient to hold the wheel together during rotation. As stronger materials become available in the marketplace (such as carbon nanotubes), it is envisioned that the maximum potential RPM of a wheel assembly application utilizing the present inventions will likely improve even further.

With continuing reference to FIGS. 1-8, and specific reference to FIGS. 7-8, system 100 can include a cooling system 200, which can be any type of cooling system required by a particular application, such as a heat removal or refrigeration system, for cooling one or more components of the bearing system. For example, cooling system 200 can at least partially maintain one or more HTS components at a temperature, or within a range of temperatures, sufficient to allow the HTS material(s) to exhibit superconductive properties (e.g., at or below the transition temperature or critical temperature at which the electrical resistivity of the material drops to zero). Cooling system 200 can be any one of many different types of cooling systems known in the art, separately or in combination, for maintaining a low temperature for a superconducting or other material. Alternatively, cooling system 200 can be specifically developed in accordance with particular applications of the present disclosure. As examples, cooling system 200 can be or include a closed-cycle refrigeration system or a cryogenic fluid system, separately or in combination. For example, cooling system 200 can include a cryogenic fluid, such as liquid nitrogen, and one or more components of system 100 can be immersed in the cryogenic fluid. In such an embodiment (one of many), a cryogenic fluid can provide cooling power by evaporation. As another example, cooling system 200 can be or include a closed-cycle type refrigerator, which can include a fluid (e.g., a gas such as helium) having suitable heat transfer characteristics and can use processes of compression, heat exchange, and expansion to provide cooling power. For instance, cooling system 200 can be or include a so-called Gifford-McMahon cooler, which can include a compressor and a cold head (e.g., a cold plate) or other structure for cooling. In such an embodiment (one of many), one or more components of system 200 can, but need not, be disposed distally from one another, which can allow for more flexibility, as described in further detail below.

As mentioned above, cooling system 200 can, but need not, include at least a portion of one or more supports 110. For example, support 110 can be comprised at least partially of a thermally conductive material (e.g., copper or another metal) and can be disposed in thermal contact with one or more components of system 100, such as bearing portion 102. In an embodiment wherein bearing portion 102 includes HTS material(s), for example, support 110 can at least partially cool the HTS material by conduction. Alternatively, or collectively, cooling system 200 can include a cooling assembly 202 for cooling one or more components of system 100. Cooling assembly 202 can be any type of cooling assembly required by a particular application, including a device adapted to maintain relatively low temperatures within an internal portion 204 thereof for cooling material disposed therein or otherwise thermally coupled thereto. Internal portion 204 can be at least partially insulated from the surrounding environment, such as the atmosphere. Internal portion 204 can be at least partially adapted to resist heat transfer, for example by way of conduction, radiation or otherwise. Heat transfer from conduction (i.e., air molecules transferring heat through a wall of the cooling assembly) can, but need not, be at least partially limited by maintaining an at least partial vacuum within internal portion 204. Heat transfer by radiation can be at least partially minimized by utilizing so-called super-insulation, such as to reflect incoming radiation. For example, cooling assembly 202 (or portions thereof, such as internal portion 204) can include one or more super-insulating materials, such as polymer or other aerogels, and one or more super-insulating structures or techniques, such as double walls, separately or in combination. Cooling assembly 202 can be made from any material (or combination of materials) required by a particular application, such as metal, glass, plastic, fiberglass or another material. Cooling assembly 202 can, but need not, include one or more intervening portions 206 disposed at least partially within gap 126 between first and second bearing portions 102, 104. In such an embodiment, which is but one of many, intervening portion 206 can preferably be formed from a material that is not magnetized or which is otherwise adapted to at least minimize (or eliminate) any interference or effect on the coupling interaction between bearing portions 102, 104. For example, intervening portion 206 (if present) can be designed to occupy a minimal (e.g., in light of the requirements of a particular application at hand) amount of space between the HTS and magnet portions. In an embodiment wherein internal bearing portion 102 is the HTS bearing portion (see, e.g., FIG. 7), cooling assembly 202 can have one or more portions, such as a first portion 202A and a second portion 202B, coupled to bearing portion 102 for at least partially maintaining bearing portion 102 within a temperature range (e.g., a cryogenic temperature range). First and second portions 202A, 202B (and other portions, if present) of cooling assembly 202 can comprise a single cooling assembly structure or can be separate cooling assembly structures. In either case, first and second portions 202A, 202B can, but need not, be in fluid communication with one another, whether by way of being formed integrally with one another or otherwise, such as, for example, being fluidicly coupled to one another by way of one or more fluid passages, which can include any one or more of hoses, conduits, fittings, valves and other fluid communication structures required by a particular application. Cooling assembly 202 can include one or more openings 208, such as inlets, outlets or other passageways, for fluidicly communicating with one another or with one or more other components of system 100, separately or in combination. For example, system 100 can include one or more fluid sources 210 for supplying cooling fluid 214 to cooling assembly 202, such as via one or more fluid conduits 212, separately or in combination with one or more other fluid components (e.g., fittings, valves, and the like). In at least one embodiment, which is but one of many, cooling assembly 202 can be or include a cryostat that at least partially surrounds, houses, or is otherwise coupled to bearing portion 102 and/or support 110 (see, e.g., FIG. 7). In such an embodiment, fluid 214 can be a cryogenic fluid or cryogen, such as liquid nitrogen or another fluid, and fluid source 210 can provide fluid 214 to assembly 202 (including to one or more portions 202A, 202B) as needed to cool bearing portion 102 according to a particular application. Further, assembly 202 can, but need not, include one or more outlets 216, such as a vent, one-way or multi-way valve, check valve, or other passageway for allowing a fluid to escape from internal portion 204 of assembly 202. For example, outlet 216 can allow outgoing gas from an evaporated or evaporating liquid or other coolant to move out of assembly 202 or a portion thereof. As another example, one or more of first and second portions 202A, 202B of cooling assembly 202 can be or include a cold head disposed in a heat transfer relationship with at least a portion of bearing portion 102. In such an embodiment, one or more of first and second portions 202A, 202B can, but need not, be insulated from the environment, such as to perform a similar or same role as the cryostat in the liquid cryogen example, and fluid source 210 can circulate a coolant through assembly 202, including in and out of respective openings 208 (e.g., one or more inlets and one or more outlets). In another of many embodiments, wherein external bearing portion 104 is the HTS bearing portion (see, e.g., FIG. 8), first and second portions 202A, 202B can be thermally coupled to at least a portion of bearing portion 104. In such an embodiment, first and second portions 202A, 202B of cooling assembly 202 can, but need not, be separate from one another and can be coupled to bearing portion 104 in any location required by a particular application. As shown in FIG. 8 for exemplary purposes, first and second portions 202A, 202B can be coupled to one or more sides of bearing portion 104, or alternatively (or collectively) can be coupled to a top, bottom, inner or outer surface of bearing portion 104. Further, each of first and second portions 202A, 202B can, but need not, include a plurality of separate cooling portions, which can be in fluid and/or thermal communication with one another or alternatively can be fluidicly and/or thermally isolated. Otherwise, the illustrative arrangement of the cooling system 200 shown in FIG. 8 operates similarly to that described above with reference to FIG. 7 and thus need not be described again in detail here. In either case, or in other embodiments of Applicant's disclosure, cooling assembly 202 (or one or more portions thereof, such as portions 202A, 202B) can be well secured relative to a respective bearing portion for at least minimizing (or preventing) any movement relative to one another or to one or more other components of system 100. For example, cooling assembly 202 (or one or more portions thereof, such as portions 202A, 202B) can, but need not, be fixedly coupled to bearing portion 102, bearing portion 104, support 110, or another component of bearing system 100, separately or in combination, directly or indirectly. In an embodiment wherein a superconductor portion is in disposed in a rotating bearing portion (e.g., bearing portion 104), a liquid cryogen method of cooling can be used, which can at least reduce an amount of weight (e.g., from system components) added to a rotating part of the system versus one or more other cooling systems. However, this need not be the case, and another cooling method may be useable for one or more applications of the present disclosure. In an embodiment wherein a superconductor portion is disposed in a rotationally or otherwise stationary part of system 100 (e.g., bearing portion 102), the addition of cooling system 200 components to a rotating portion of system 100 can be less of a concern, depending on the application. As will be readily understood by a person of ordinary skill in the at having the benefits of Applicant's disclosure, cooling system 200 can, and in at least some embodiments likely will, include numerous other cooling components, such as conduits, lines, hoses, fittings, valves, pumps, compressors, heat exchangers, evaporators, fins, tubes, and fans or other air movers, among others. Consequently, such items known in the art need not be described in detail herein. As other examples, cooling system 200 can, but need not, include one or more control systems, which can include one or more conventional (or custom developed) components, such as controllers, memory devices, control software, sensors, transmitters, receivers, thermometers, temperature sensors, pressure sensors, power sources, and other components for cooling system or control system applications. It will be appreciated that control system 150 described above (if present) can likewise include one or more of the foregoing components.

Having described above one or more embodiments of the systems and methods of the present disclosure, one or more additional embodiments will now be described. A person of ordinary skill in the art having the benefits of the present disclosure will appreciate that one or more of the principles or aspects of the foregoing embodiments may likewise be applicable to one or more of the following embodiments, and vice versa. Consequently, certain aspects described above need not be, and may not be, repeated below.

Figure 9:
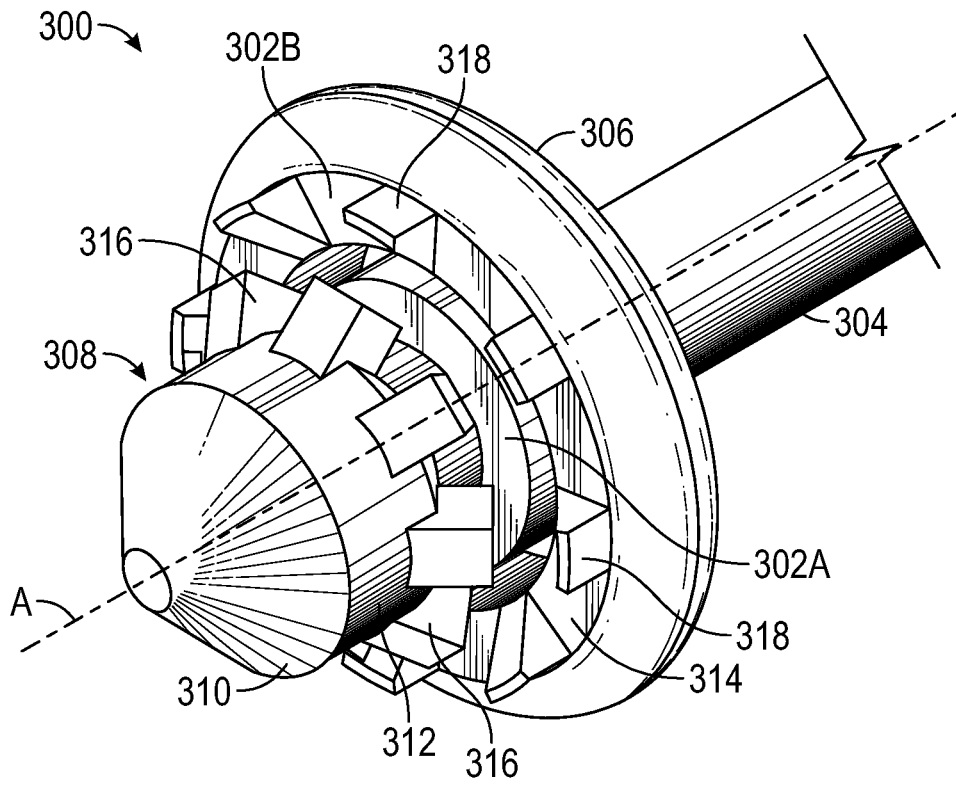
FIG. 9 illustrates an isometric view of one of many embodiments of a wheel assembly according to the disclosure.
Figure 10:
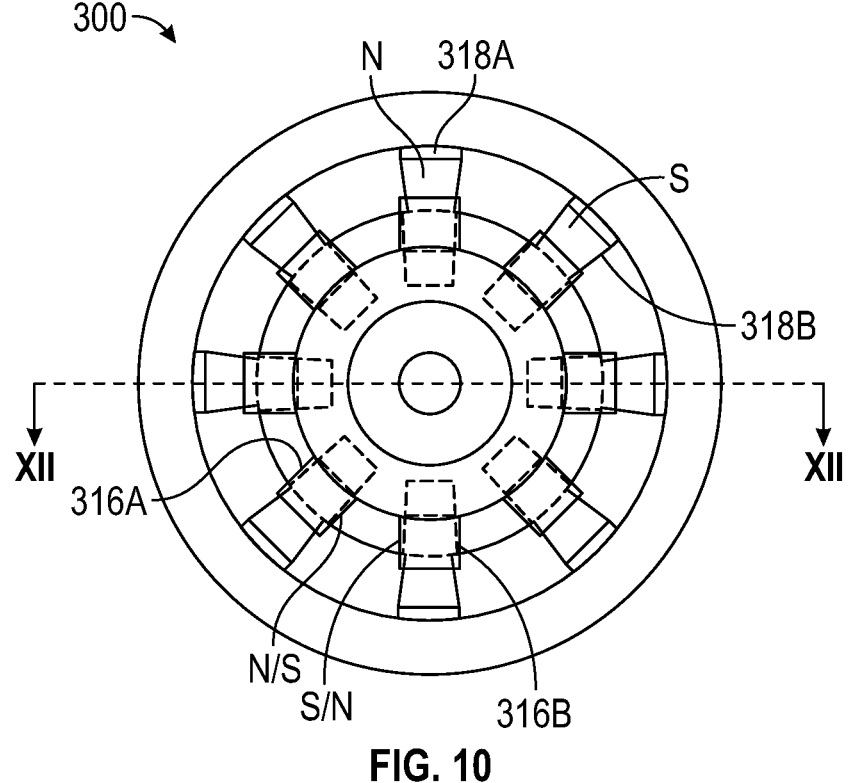
FIG. 10 is a side schematic view of the embodiment of FIG. 9.
Figure 11:
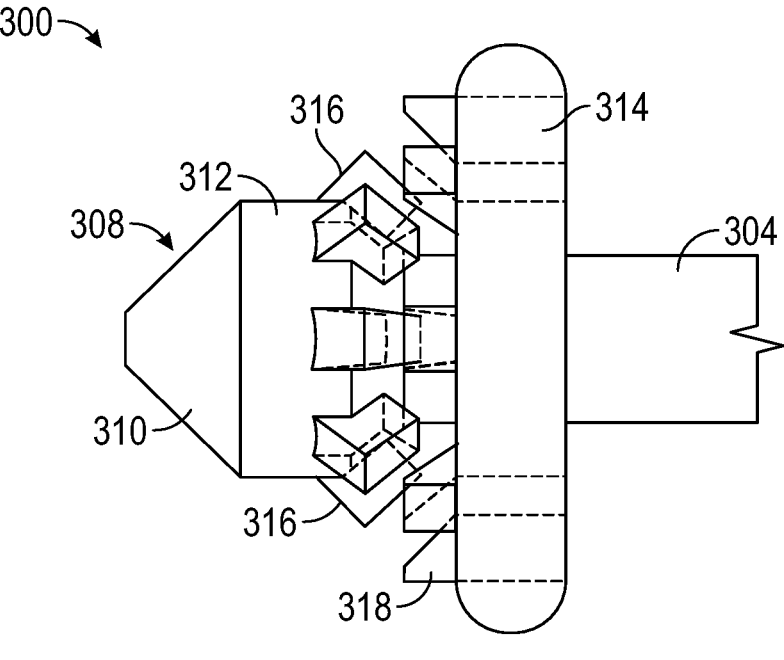
FIG. 11 is another side schematic view of the embodiment of FIG. 9.
Figure 12:
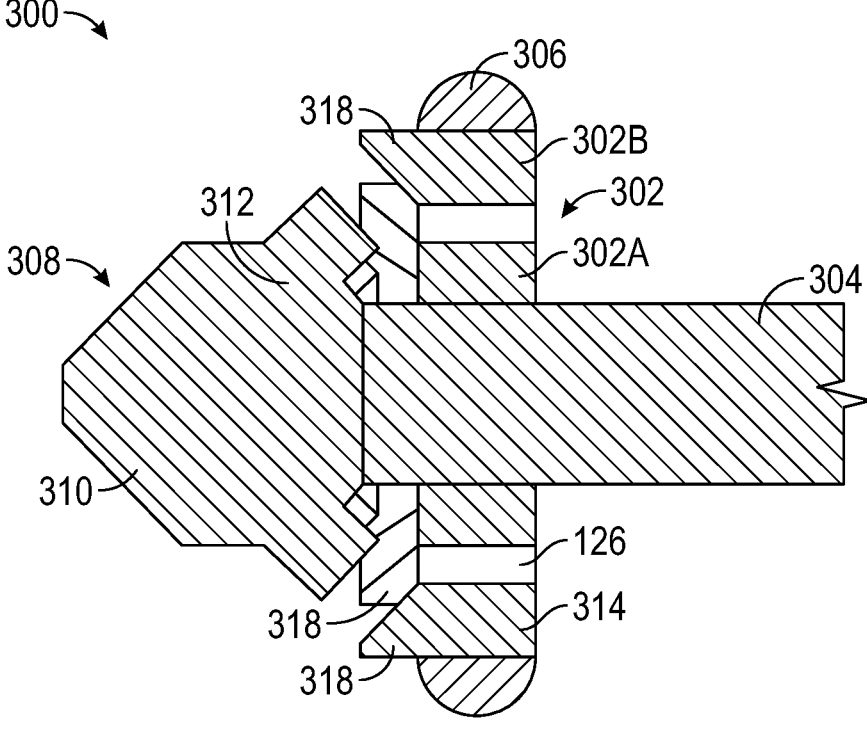
FIG. 12 is a cross-sectional top schematic view of the embodiment of FIGS. 9-11.

FIG. 9 illustrates an isometric view of one of many embodiments of a wheel assembly according to the disclosure. FIG. 10 is a side schematic view of the embodiment of FIG. 9. FIG. 11 is another side schematic view of the embodiment of FIG. 9. FIG. 12 is a cross-sectional top schematic view of the embodiment of FIGS. 9-11. FIGS. 9-12 will be described in conjunction with one another.

In at least one embodiment of the present disclosure, a bearing system (such as one or more of the bearing systems described above) can be, or can be incorporated into, one or more systems or apparatuses for movement or for supporting movement. As one of many examples, a bearing system 300 can be or include a wheel assembly for supporting rotational movement, and can include a bearing 302 coupled to one or more other components for moving, such as one or more supports 304 for supporting one or more components of the assembly. Bearing 302 can include a first bearing portion 302A, such as an inner (or outer) bearing portion, and a second bearing portion 302B, such as an outer (or inner) bearing portion. As described elsewhere herein, one of bearing portions 302A, 302B can be an HTS bearing portion and the other bearing portion 302A, 302B can be a magnet bearing portion. Of course, it will be appreciated that either of bearing portions 302A, 302B can be the HTS portion while the other can be the magnet portion as required or desired for a particular application or implementation at hand. It will also be appreciated that the relational terms used herein (e.g., inner, outer, first, second, etc.) are used for clarity and convenience of explanation, and that each bearing portion 302A, 302B can, but need not, include a plurality of HTS and/or magnet portions, separately or in combination with one another and/or one or more other non-HTS or non-magnet portions (e.g., couplers, housings, covers, or other components). In the exemplary embodiment of FIG. 9 included for illustrative purposes (which is but one of many), portion 302A is shown to be the HTS portion and portion 302B is shown to be the magnet portion, but this need not be the case (as explained above and elsewhere herein). Bearing portion 302A can be coupled to support 304, which can be or include an axle, spindle, shaft, bar, rail or other structure, and which can, but need not, be adapted to rotate or otherwise move. Portion 302A and support 304 can be coupled in any manner required by a particular application, including directly, indirectly, being formed integrally, or in another manner, in whole or in part. Bearing portion 302B can be magnetically coupled to bearing portion 302A as explained elsewhere in this disclosure, such as with regard to bearing system 100 described above, and bearing portions 302A, 302B can be adapted to rotate relative to one another, singly or in combination. In at least one embodiment, portion 302B can be or include a wheel adapted to rotate about axis A, which can, but need not, be a central longitudinal axis of support 304. Bearing portion 302B can include an outer bearing portion 306, which can, but need not, include a tire, covering, housing, coating or other structure or surface (of any shape) adapted to contact a surface supporting system 300. Bearing portion 302B and outer portion 306 can be formed integrally or can be formed separately and otherwise coupled to one another, in whole or in part, which can, but need not, include the use of one or more fasteners, adhesives or other couplers.

In at least one embodiment, which is but one of many, a bearing system 300 can include a drive system 308 for moving one of bearing portions 302A, 302B relative to the other and/or one or more other components of the system. Drive system 308 can include a driver 310 for driving or otherwise causing or inducing one or more system components to move, such as rotationally or otherwise. Driver 310 can be coupled to support 304, but need not be and can alternatively (or collectively) be coupled to one or more other supports, or it can be self-supporting, for example. In at least one embodiment, driver 310 can be or include an electromagnetic driver (as further described below), but it need not be, and can be any type of driver required by a particular application, such as a mechanical, electrical, or electromechanical driving assembly. For example, driver 310 can be or include a rotating shaft, such as a drive shaft driven by a motor, engine, pump or other prime mover, or, as other examples, a transmission, PTO system, or drive linkage system. Drive system 308 can include a driving portion 312 coupled to driver 310, which can be adapted to move a driven portion 314. Driven portion 314 can include, for example, structure coupled to one or more bearing portions, such as to bearing portion 302B, including being formed integrally therewith, in whole or in part. Driving portion can, but need not, include one or more driving couplers 316; similarly, driven portion 314 can, but need not, include one or more driven couplers 318. Each of portions 312, 314 can include any number of couplers 316, 318 required by a particular application, one or more of which can be coupled to one another and to the respective driving portions in any manner suitable for an application at hand (including integrally), in whole or in part. For instance, each coupler 316, 318 can be coupled to one or more other like couplers, or alternatively each coupler 316, 318 can be separate; further, one or more couplers can be replaceable, such as by being removably coupled to one or more other components, such as a respective portion 312, 314. A driving portion 312 can have the same number (which can be any number) of driving portions 316 as a corresponding driven portion 314 has driven couplers 318; alternatively, system 300 can include different numbers of corresponding couplers 316, 318. One or more driving couplers 314 (if present) can be coupled to one or more driven couplers 318 (if present) for coupling driving portion 312 and driven portion 314 to one another. Alternatively (or collectively) one or more of driving and driven portions 312, 314 may not include couplers and one of the portions can be coupled to the coupler(s) of the other portion or, as another example, couplers 316, 318 can be absent altogether and drive portions 312, 314 can be coupled to one another without the use of couplers, such as directly or otherwise. In at least one embodiment, driving portion 312 can be mechanically coupled to driven portion 314, such as for rotating portion 314 about axis A. For example, one or more sets of corresponding couplers 316, 318 (including one or more sets of couplers) can be coupled to one another, removably or otherwise. While such an embodiment can be useful in one or more applications or implementations of Applicant's disclosure, it can nonetheless be subject to one or more limitations of a driver in the system (e.g., friction, maximum speed or rate, etc.). In at least one other embodiment, such as an embodiment including an electromagnetic or other magnetic driver (as mentioned above), driving portion 312 need not be mechanically coupled to driven portion 314. For example, driving portion 312 can be magnetically coupled to driven portion 314. In at least one of such embodiments, one or more corresponding or communicating sets (e.g., a pair or other combination) of driving, driven couplers 316, 318 (if present) can include a permanent magnet coupler and a magnetic coupler (which can, but need not, also be or include a magnet). The magnet coupler can be a driving coupler and the magnetic coupler can be a driven coupler, or vice versa, and such arrangement can, but need not, differ as between two or more sets of corresponding couplers (if present). Driving portion 312 can rotate (e.g., about axis A), such as by way of being rotated by driver 310 or a drive system coupled thereto, and the magnetic attraction between each set of corresponding couplers 316, 318 (or otherwise between driving portion 312 and driven portion 314) can cause bearing portion 302B to rotate or otherwise move along with driving portion 312. In at least one other of such embodiment, which yet again is but one of many, driving portion 312 (or driven portion 314) can be or include an electromagnet. For example, driving portion 312 can include one or more electromagnetic driving couplers 316 and driven portion 314 can include one or more magnetic driven couplers 318 having a corresponding driving coupler (or couplers) 316 associated therewith (or vice versa). In such an embodiment, each magnetic coupler can be polarized and each electromagnetic coupler can be adapted (separately or in combination) to cause a driven portion 314 (which may be either drive portion) to move, such as to rotate about an axis. As shown in FIG. 10 for illustrative purposes, in at least one of such embodiments, which is but one of many, driven portion 312 can, but need not, be disposed in a rotationally fixed position and driving portion can be or be coupled to a bearing portion 302B adapted to rotate about a bearing portion 302A, such as by being rotatably coupled thereto or there about. Two or more adjacent driven couplers 318 (if present), such as driven couplers 318A, 318B, can have alternating polarities, and driving couplers 316 can be adapted to change polarities during operation (e.g., in response to one or more elapsed times or another condition or instruction), such as to alternate between N and S polarities, for example. Adjacent driving couplers 316 (if present) can, but need not be adapted to alternate polarities in a manner opposite to one another. In other words, at a point in time (or for a period of time) during operation, which can be any point or period of time required by a particular application, one driving coupler (e.g., coupler 316A) (which can be any driving coupler, if present) can have a North polarity, and an adjacent driving coupler (e.g., coupler 318B) can have a South polarity, or vice versa. At a next point or period of time, the polarities of drive couplers can reverse or otherwise change to an opposite polarity (i.e., from N to S, or vice versa). Such a change can occur at any time or time interval, and any coupler position or relationship of coupler positions, required by a particular application. For example, in at least one embodiment, which is but one of many, such a change in polarities can occur at or around the time a driven coupler 318 reaches a position (e.g., a rotational or other position) that is midway between two adjacent driving couplers 316. As such, it will be appreciated and understood that an electromagnetic driver 310 can magnetically rotate a driven portion 314, for example, by way of controlled magnetic coupling therewith. More specifically, considering an example pair or other set of adjacent driving couplers (e.g., 316A, 316B) relative to a single example driven coupler (e.g., 318A or 318B) having a polarity of, for example, N, over an example period of time, one driving coupler 316 can have N polarity and the other driving coupler 316 can have S polarity. The N driving coupler can repel the driven coupler and the S driving coupler can attract the driven coupler. In this manner, the driven coupler can tend to move from a position near the former to a position near the latter. Over a subsequent period of time, the polarity of each driving coupler can reverse, and the example driven coupler can be biased accordingly, including toward a third example driving coupler adjacent to one of those mentioned above and, for example, having a polarity opposite that of the driven coupler at such time. Similar principles can be applied to the remaining couplers 316, 318 in an embodiment (if present) which can result in a driving force for driving driven portion 314 and/or second bearing portion 302B. Such a driving force can be controlled, for example increased or decreased, by controlling an amount of current flowing to or through one or more electromagnetic driving portions 312 and/or one or more driving couplers 316, if present. Furthermore, similar methods can be used to slow movement of a driven portion 314 if required or desired in a particular application, for example, as part of a braking system. System 300 can, but need not, include one or more other of the components disclosed herein, separately or in combination with one another, in whole or in part. For example, in at least one embodiment, system 300 can include a control system (not shown) adapted to measure, control, change, and/or display to a user one or more aspects or characteristics of the system. As another example, system 300 can include a cooling system (of which support 304, for example, can be a part), which can include a cooling assembly, cryogen, and/or other cooling equipment, such as one or more of the components shown in FIGS. 1-8.

Figure 13:
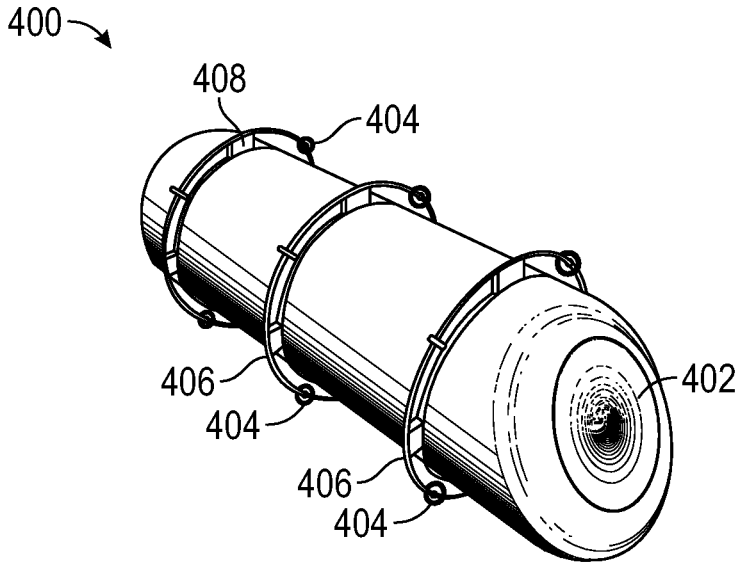
FIG. 13 illustrates an isometric view of one of many embodiments of a transport system according to the disclosure.
Figure 14:
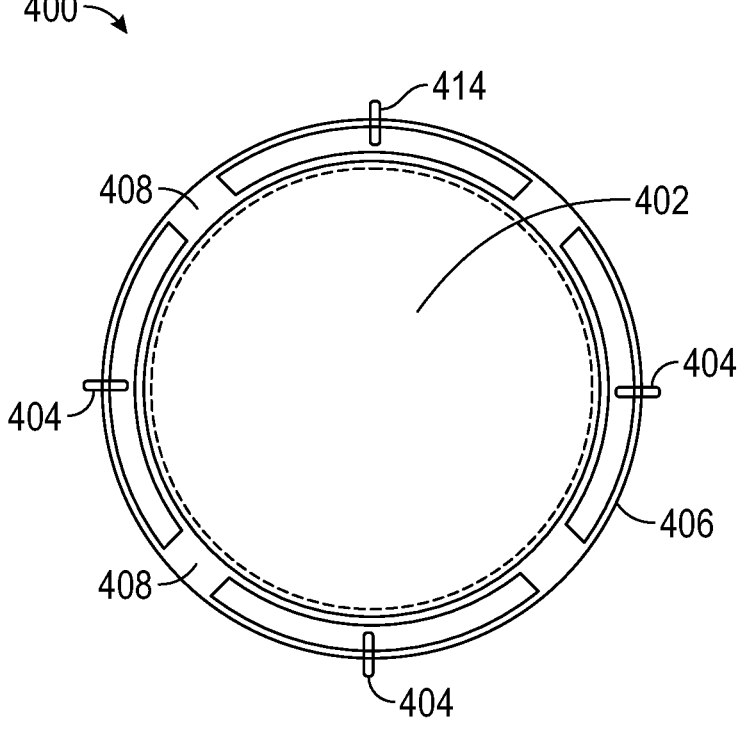
FIG. 14 is a schematic end view of the embodiment of FIG. 13.
Figure 15:
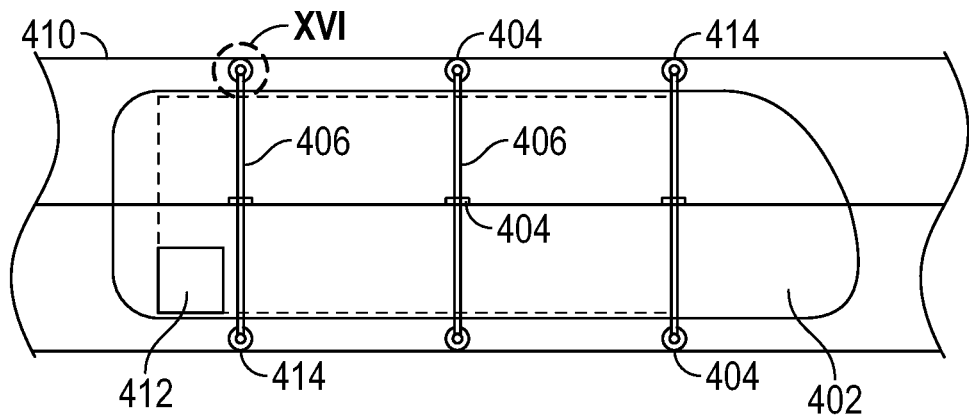
FIG. 15 is a side schematic view of the embodiment of FIGS. 13-14.
Figure 16:
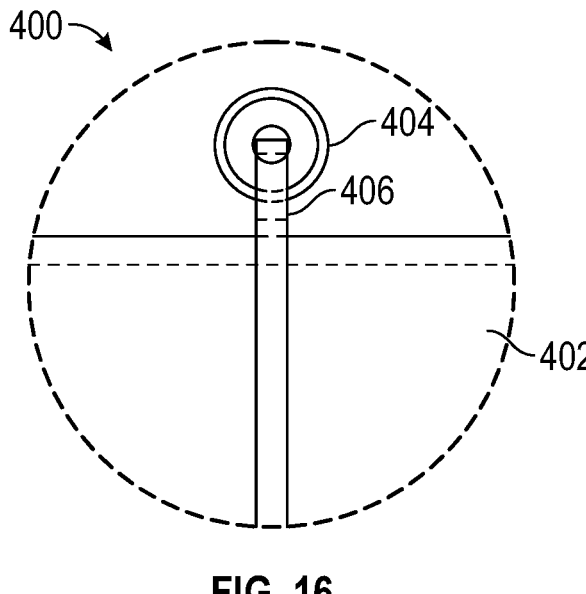
FIG. 16 is a schematic detail view of a portion of FIG. 15.

FIG. 13 illustrates an isometric view of one of many embodiments of a transport system according to the disclosure. FIG. 14 is a schematic end view of the embodiment of FIG. 13. FIG. 15 is a side schematic view of the embodiment of FIGS. 13-14. FIG. 16 is a schematic detail view of a portion of FIG. 15. FIGS. 13-16 will be described in conjunction with one another.

In at least one embodiment of the present disclosure, a bearing system (such as one or more of the bearing systems described above) can be, or can be incorporated into, one or more transport (or transportation) systems 400, such as a system or apparatus for moving or supporting movement from one place to another. As one of many examples, a transport system 400 can include a body 402 for supporting one or more items (including passengers) being moved. Body 402 can include, for example, a vehicle body, chassis, frame or other structure for supporting items during movement, such as storage compartments and the like, separately or in combination with one another. Body 402 can be comprised of any materials required by a particular application, such as plastic, glass, metal and other materials, separately or in combination, and can include one or more of any of the features or other structures commonly found in conventional transportation systems, such as seating, safety mechanisms and other items, such as luxury items. Transport system 400 can include one or more bearing systems 404 coupled to body 402 for supporting movement thereof, which can include any number of bearing systems required by a particular application. For example, in one or more embodiments of the present disclosure, system 400 can include two, three, four, five, six, eight, up to eighteen, or more or less, bearing systems according to Applicant's disclosure, such as a number of bearing systems similar to a number of wheels or tires found on one or more conventional transport systems, e.g., bicycles, motorcycles, passenger cars and trucks, semi-trucks and aircraft, among others. One or more of bearing systems 404 can be or comprise any of the bearing systems disclosed herein, in whole or in part, separately or in combination, including any application-specific implementation or adaptation of any of them. As such, bearing systems 404 need not be described again in detail here. One or more bearing systems 404 can be coupled or otherwise disposed at least generally beneath body 402, such as in a conventional vehicle arrangement, but this need not be the case. For example, as shown in the exemplary embodiment of FIGS. 13-16, which is but one of many, one or more bearing systems can be arranged on the top, bottom, side or another portion of a body 402 as required by or desired for a particular application, whether directly or indirectly. For instance, one or more bearing systems 404 can be coupled to a support 406, such as a frame, brace or other structure for supporting rotational movement of bearing systems 404, which can, for example, support linear, rotational or other movement of body 402. Support 406 can be circular, but need not be, and can alternatively be another shape, which can be any shape, such as square, rectangular or otherwise. One or more supports 406, each of which can include any number of bearing systems 404 required by a particular application (whether the same number or a different number), can be coupled to body 402 with one or more couplers 408, which can include, for example, braces, frames, fasteners or other structural members, separately or in combination. In at least one embodiment, which is but one of many, supports 406 and bearing systems 404 can be adapted and arranged to communicate with a track system 410 for directing or otherwise guiding the movement of system 400, such as by at least partially defining a path along which body 402 and/or other components of the system can travel. Track system 410 can include any type of guidance system required by a particular application, such as a track, one or more rails, cables or other support structures, or, as another example, an at least partially enclosed tube through which body 402 can pass. In an embodiment wherein track system 410 comprises a tube, which is but one of many, at least a portion of the tube can be at least partially evacuated of air, such as for maintaining the tube in an at least partial state of vacuum. In at least one embodiment, such as a vacuum tube embodiment, transport system 400 can, but need not, include a self-contained oxygen system, such as for providing breathable air to passengers aboard body 402. Transport system 400 can, but need not, include one or more prime movers 412 for propelling, forcing or otherwise moving body 402 (and any contents, if present) along a path. Prime mover 412 can include, for example, a hydrocarbon or otherwise powered motor or engine (which can including transmission, linkage, fuel and other components, as the case may be), or, as another example, prime mover 412 can comprise one or more jet propulsion systems, such as a rocket. Alternatively, prime mover 412 can be absent, and body 402 can move along a path in one or more other manners, such as by way of gravity or a magnetic propulsion system. In at least one embodiment, system 400 can, but need not, include one or more conventional bearing systems 414 in combination with one or more bearing systems according to the disclosure.

Figure 17:
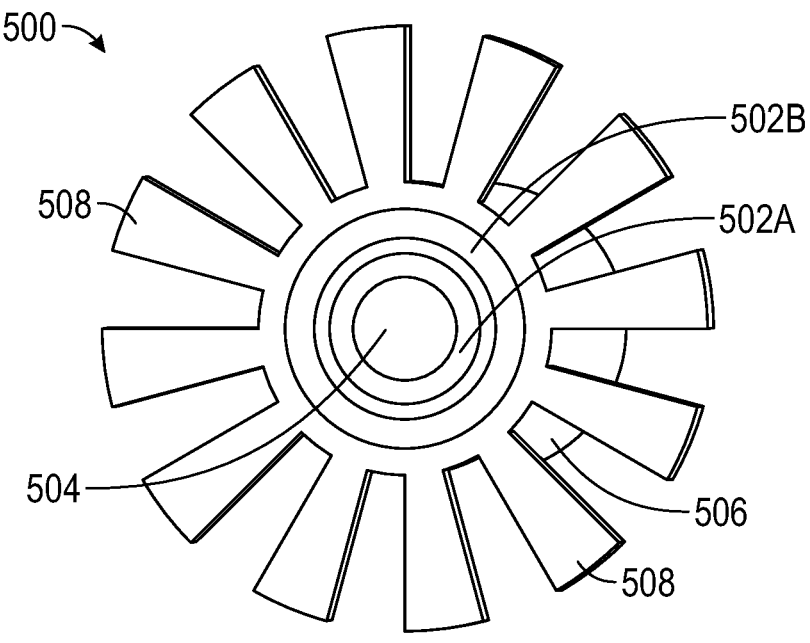
FIG. 17 illustrates an isometric view of one of many embodiments of a turbine system according to the disclosure.
Figure 18:
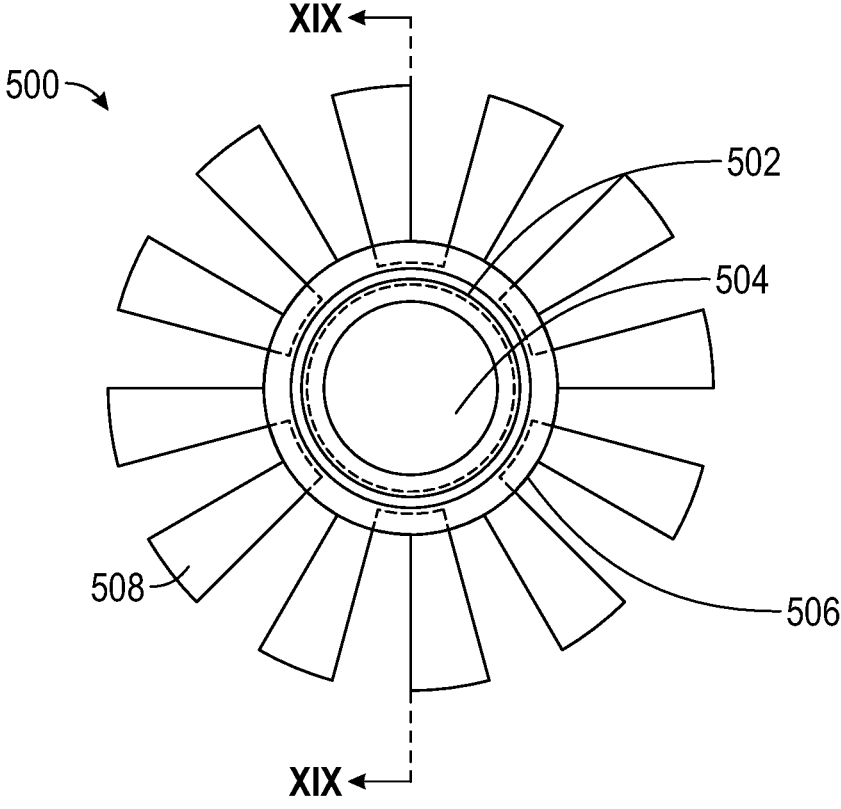
FIG. 18 is a schematic end view of the embodiment of FIG. 17.
Figure 19:
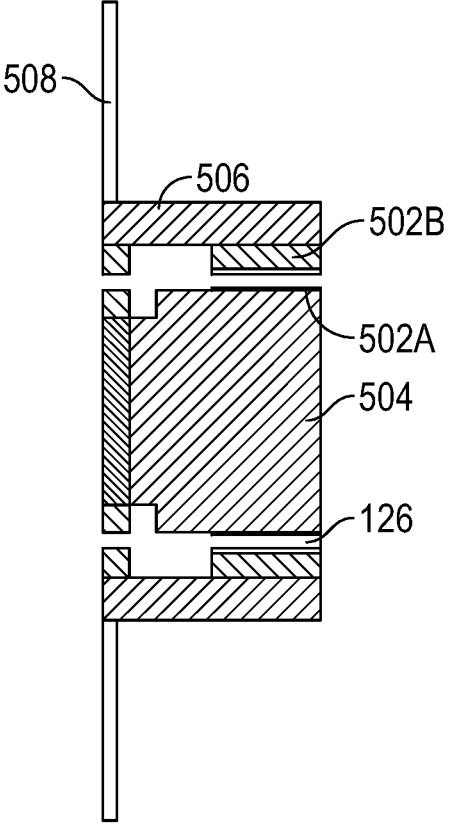
FIG. 19 is a cross-sectional schematic view of the embodiment of FIGS. 17-18.

FIG. 17 illustrates an isometric view of one of many embodiments of a turbine system according to the disclosure. FIG. 18 is a schematic end view of the embodiment of FIG. 17. FIG. 19 is a cross-sectional schematic view of the embodiment of FIGS. 17-18. FIGS. 17-19 will be described in conjunction with one another.

In at least one embodiment of the present disclosure, a bearing system (such as one or more of the bearing systems described above) can be, or can be incorporated into, one or more turbine systems 500, such as a system or apparatus for generating electricity or another type of turbine. As one of many examples of an embodiment, a turbine system 500 can include one or more bearing systems 502 for supporting rotational movement between a support 504 and a fan 506. Each bearing system 502 can include one or more bearing portions, such as bearing portions 502A, 502B, which can include an HTS bearing portion and a magnet bearing portion as described elsewhere herein. One or more of bearing systems 502 can be or comprise any of the bearing systems disclosed herein, in whole or in part, separately or in combination, including any application-specific implementation or adaptation of any of them. As such, the bearing systems 502 of this embodiment of the present disclosure, which is but one of many, need not be described again in detail here. Support 504 can, but need not, be rotationally fixed, and fan 506, which can include one or more blades or fins 508, can rotate about support 504 with at least reduced friction relative to one or more conventional turbines that lack the bearing systems of the present disclosure.

Figure 20:
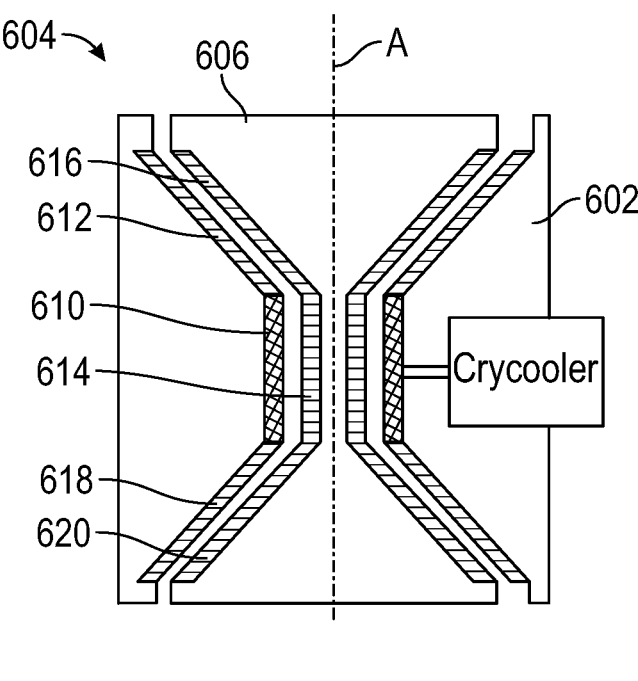
FIG. 20 is a cross-sectional schematic side view of another of many embodiments of a bearing system having a cooling system according to the disclosure.
Figure 21:
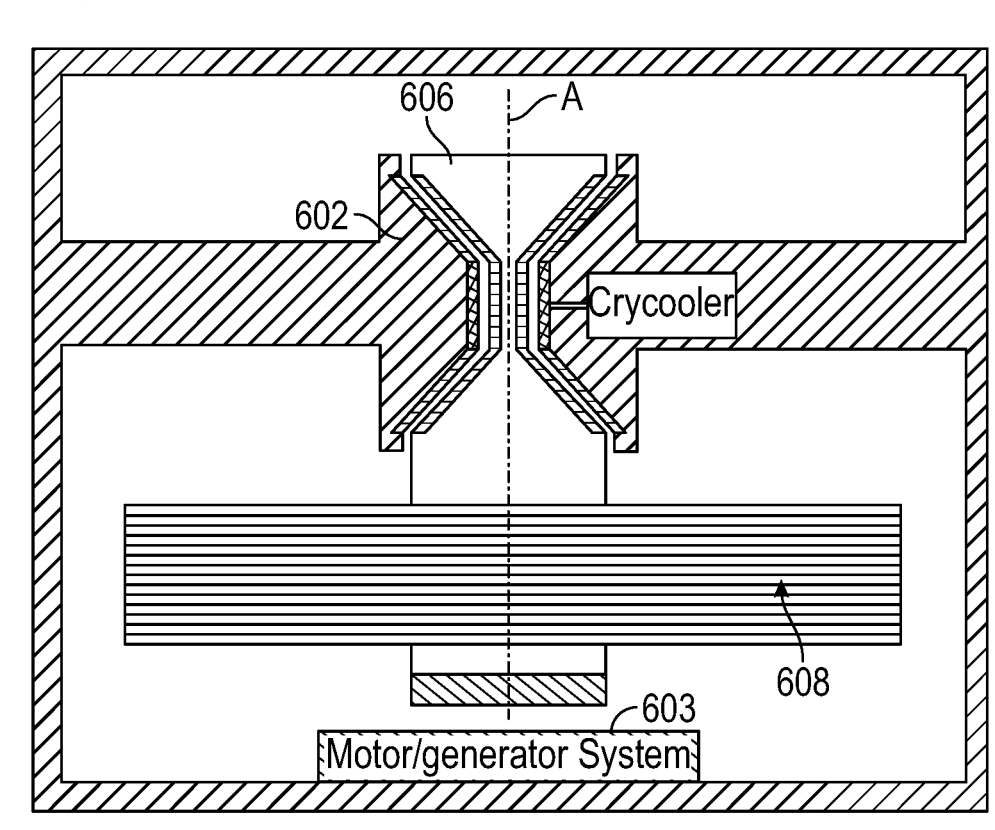
FIG. 21 is a cross-sectional schematic side view of one of many embodiments of a bearing and flywheel system according to the disclosure.
Figure 22:
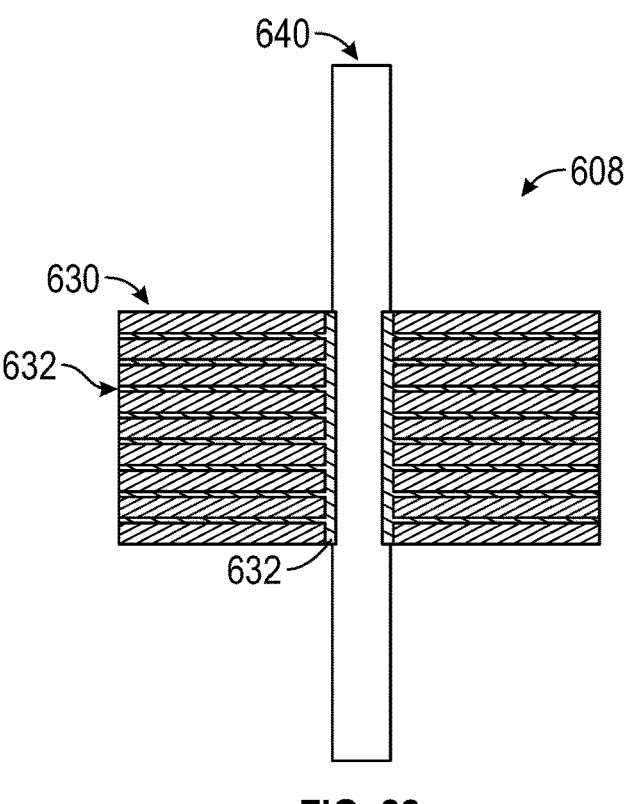
FIG. 22 is a cross-sectional schematic side view of one of many embodiments of a layered flywheel assembly according to the disclosure.
Figure 23:
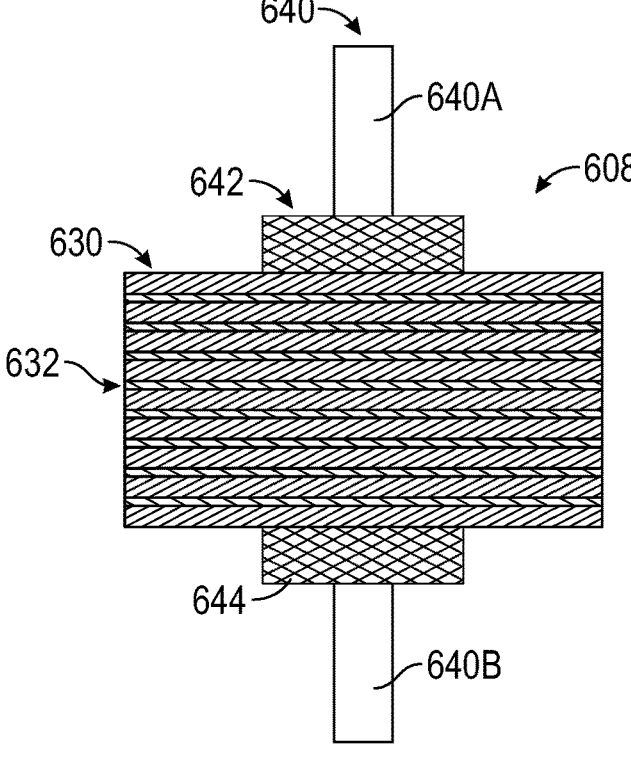
FIG. 23 is a cross-sectional schematic side view of another of many embodiments of a layered flywheel assembly according to the disclosure.
Figure 24:
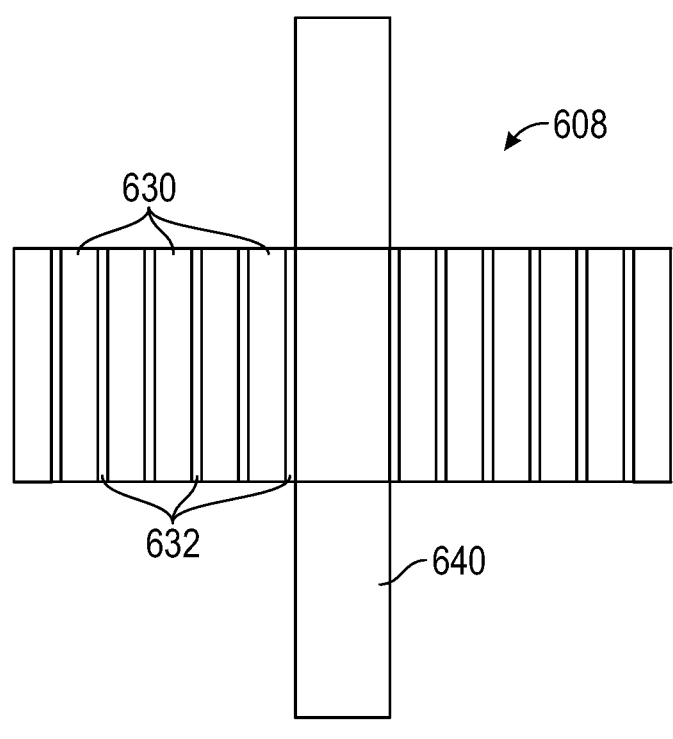
FIG. 24 is a cross-sectional schematic side view of yet another of many embodiments of a layered flywheel assembly according to the disclosure.
Figure 25:
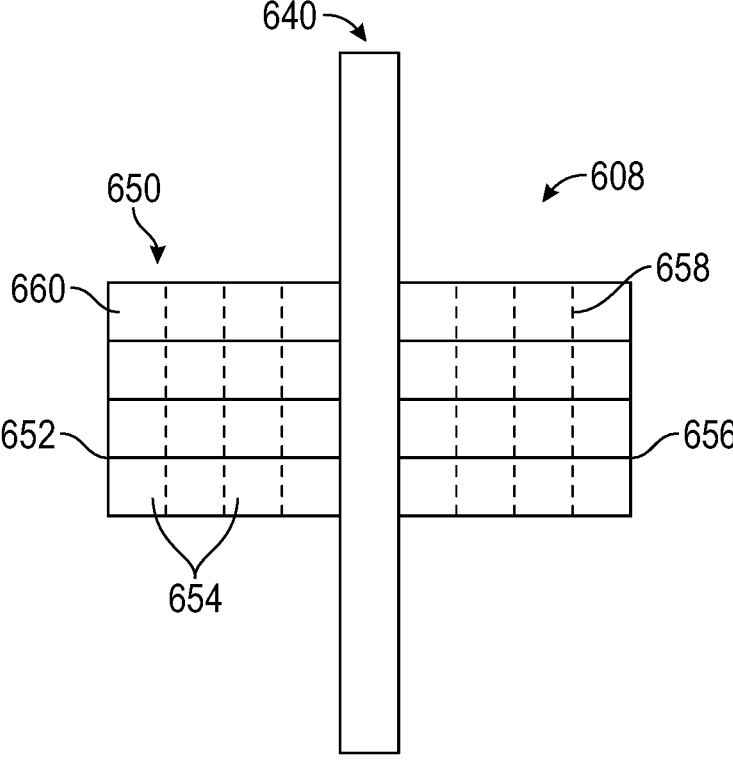
FIG. 25 is a cross-sectional schematic side view of one of many embodiments of a porous flywheel assembly according to the disclosure.
Figure 26:
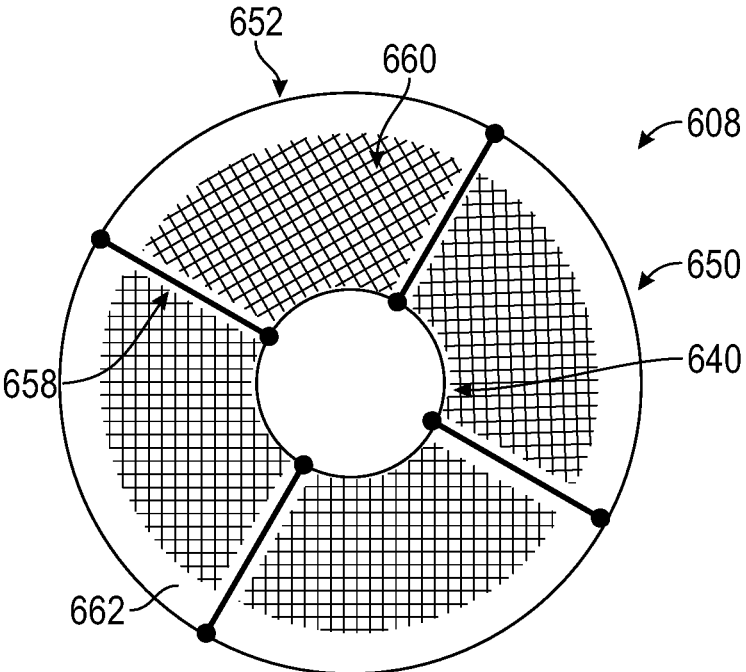
FIG. 26 is a schematic top view of yet another of many embodiments of a porous flywheel assembly according to the disclosure.
Figure 27:
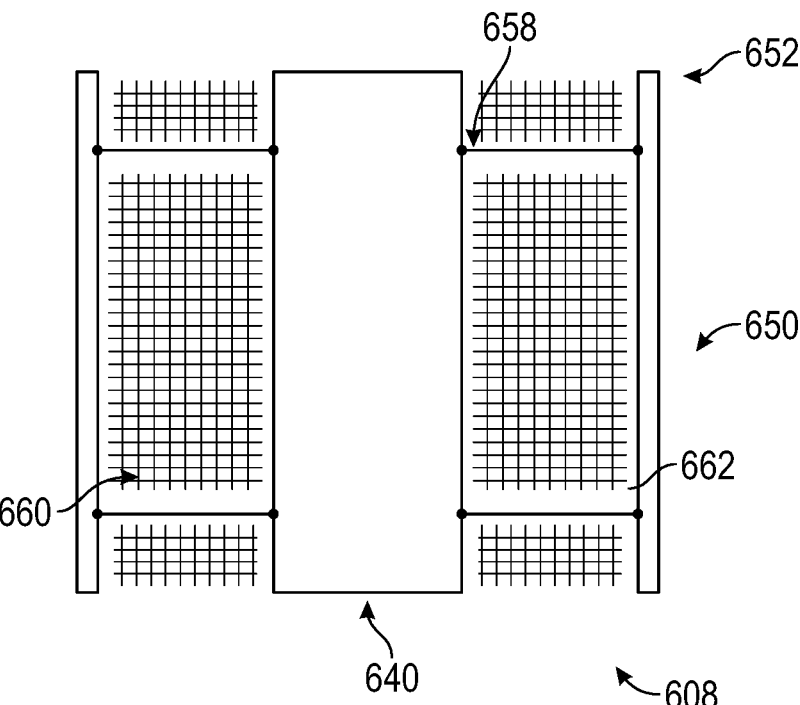
FIG. 27 is a partial cross-sectional schematic side view of the flywheel assembly of FIG. 26.

FIG. 20 is a cross-sectional schematic side view of another of many embodiments of a bearing system having a cooling system according to the disclosure. FIG. 21 is a cross-sectional schematic side view of one of many embodiments of a bearing and flywheel system according to the disclosure. FIG. 22 is a cross-sectional schematic side view of one of many embodiments of a layered flywheel assembly according to the disclosure. FIG. 23 is a cross-sectional schematic side view of another of many embodiments of a layered flywheel assembly according to the disclosure. FIG. 24 is a cross-sectional schematic side view of yet another of many embodiments of a layered flywheel assembly according to the disclosure. FIG. 25 is a cross-sectional schematic side view of one of many embodiments of a porous flywheel assembly according to the disclosure. FIG. 26 is a schematic top view of yet another of many embodiments of a porous flywheel assembly according to the disclosure. FIG. 27 is a partial cross-sectional schematic side view of the flywheel assembly of FIG. 26. FIGS. 20-27 will be described in conjunction with one another.

In at least one embodiment of the present disclosure, a bearing system (such as one or more of the bearing systems described above) can be, or can be incorporated into, one or more flywheel systems, such as a FESS for supporting energy storage. One or more embodiments of the present disclosure can maximize the load and stabilization carried by permanent magnets; because the magnets can be angled, the repulsive magnetic force produces both lift and partial stabilization by a gravitational restoring force. Residual load can be carried by a relatively small amount of high-temperature superconductor ("HTS") which, unlike with previous HTS-based designs, can more easily be cooled by a small cryogen-free cooler. Furthermore, the issue of flux creep is mitigated, reducing the need to periodically warm up the system and the material stresses induced by such frequent temperature cycling.

The angling of the magnets can allow for a wide range of tunability by varying the parameters of the system, such as the angle of the magnets with respect to a rotational axis, the angle of the magnets with respect to each other, and by varying the width of some of the magnets, to name a few. In at least one embodiment, the magnets can be backed with magnetic iron, the shape of which can be tuned to minimize the negative stiffness of the permanent magnet portion of the bearing system.

In at least one embodiment, a bearing and flywheel system 600 can include a first bearing portion 602 having an opening 604 of a first dimension there through and a central longitudinal axis A, a second bearing portion 606 having a second dimension, the second dimension being smaller than the first dimension, and a flywheel 608 coupled to the second bearing portion 606. One of the first and second bearing portions 602, 606 can be at least partially composed of an HTS 610 and a first magnet 612. Another of the first and second bearing portions 602, 606 can be at least partially composed of a second magnet 614 and a third magnet 616. The second bearing portion 606 can be disposed at least partially within the opening 604 through the first bearing portion 602. A gap can exist between an outer surface of the second bearing portion 606 and an inner surface of the first bearing portion 602. The second bearing portion 606 can be configured to rotate about the central longitudinal axis A of the first bearing portion 602 (or another axis) relative to the first bearing portion 602.

In at least one embodiment, the first bearing portion 602 can be configured to repel the second bearing portion 606 so that the second bearing portion 606 is biased toward the central longitudinal axis A. In at least one embodiment, the first bearing portion 602 can be configured to repel the second bearing portion 606 so that the second bearing portion 606 is centered along the central longitudinal axis A. For example, the HTS 610 can be configured to repel the second magnet 614 so that the second bearing portion 606 is biased toward a concentric position about the central longitudinal axis A. In at least one embodiment, the first magnet 612 can be configured to repel the third magnet 616 so that the second bearing portion 606 is biased toward a concentric position about the central longitudinal axis A.

In at least one embodiment, the HTS 610 and the second magnet 614 can be configured to at least partially resist longitudinal and/or lateral movement of the second bearing portion 606. In at least one embodiment, the HTS 610 and the second magnet 614 can have exterior surfaces that are disposed parallel to one another and parallel to the central longitudinal axis A.

In at least one embodiment, the first magnet 612 and the third magnet 616 can be configured to at least partially resist longitudinal and/or lateral movement of the second bearing portion 606. In at least one embodiment, the first magnet 612 and the third magnet 616 can have exterior surfaces that are disposed parallel to one another and at an angle relative to the central longitudinal axis A.

In at least one embodiment, the system 600 can include one or more additional magnets coupled to one or both bearing portions, such as a fourth magnet 618 coupled to one of the first and second bearing portions 602, 606 and a fifth magnet 620 coupled to the other of the first and second bearing portions 602, 606. The fourth magnet 618 and the fifth magnet 620 can be configured to repel one another and to thereby at least partially resist longitudinal and/or lateral movement of the second bearing portion 606 relative to the first bearing portion 602. The fourth magnet 618 and the fifth magnet 620 can have exterior surfaces that are disposed parallel to one another and at an angle relative to the central longitudinal axis A.

In at least one embodiment, the first magnet 612 and the third magnet 616 can have exterior surfaces that are disposed parallel to one another and at a first angle relative to the central longitudinal axis A and the fourth magnet 618 and the fifth magnet 620 can have exterior surfaces that are disposed parallel to one another and at a second angle relative to the central longitudinal axis A. The first and second angles can be equal and/or opposite. In at least one embodiment, the first and second angles are complimentary. In at least one embodiment, the first and second angles are different. Once again, the designations "first," "second," "third" and so on are used herein for clarity and explanation and are not alone determinative of which magnets, bearing portions or other components are referenced by any such designation.

Any of the magnets can be or include an annular magnet and/or can comprise a plurality of magnet segments. As should be apparent from the figures and discussion thereof, the pairs of magnets may be configured to oppose one another in order to hold the second bearing portion 606 in position relative to the first bearing portion 602. Any characteristics of the magnets, such as size, shape, quantity, strength, and orientation can be manipulated to oppose other forces, such as the weight of the second bearing portion 606 and/or the flywheel 608, as well as other forces acting on components of the system 600. For example, where there is a force pulling in one direction along the central longitudinal axis A, the first magnet 612 and the third magnet 616 may differ from the fourth magnet 618 and the fifth magnet 620 with regard to size, shape, quantity, strength, orientation, type, material, or any combination thereof.

In at least one embodiment, the flywheel 608 can be or include one or more laminar flywheel(s) composed of thin or ultra-thin high strength sheets (e.g., steel sheets) layered on top of each other. In such an embodiment, which is but one of many, two or more sheets of the flywheel(s) 608 can be decoupled from each other, so that if any single layer fails, the others will be unaffected and will continue operating. Because the individual layers can be decoupled from each other, many layers failing at the same time would be very unlikely, and the failure mechanisms would be benign because the layers can easily compress to absorb energy. In at least one embodiment, a system 600 according to the disclosure can have a very important additional advantage, which is that the flywheel 608 can be operated much closer to the maximum limit of the material and thereby increase energy density. One can anticipate that a certain number of layers may fail per year, and can be periodically collected and recycled into new layers for flywheel replacements.

In at least one embodiment, two or more flywheel layers can be decoupled from each other by using a viscous, energy-absorbing material (e.g., rubber) between such layers. In at least one embodiment, such a material can also be used to decouple the flywheel layers from the shaft, allowing for a system 600 to balance the flywheels 608 by repositioning them with respect to the shaft. In at least one embodiment, a phase change material, which can be switched between a soft and a hard phase, can be used as a decoupler.

In at least one embodiment, the shaft does not penetrate through the flywheel layers (see, e.g., FIG. 23), allowing for much higher speeds due to a higher tolerance for tensile forces at the center of the layers. For example, the shaft 640 can be made to couple with the flywheel layers by using two strong attractive magnets 642, 644 at either end of the flywheel layer assembly. In at least one embodiment, electrostatic forces can be substituted for magnets. In at least one embodiment, strong adhesives or another binding material (s) can be used to hold the assembly together without requiring the shaft to pass through the flywheel discs. In at least one embodiment, flywheel layers can be held together by bolts or other fasteners (not shown) placed through holes located towards the outer diameter or periphery of the discs (e.g., radially between the center and the radially outermost boundary of the flywheel), rather than near the center, to reduce stress.

In at least one embodiment, the flywheel 608 itself can be a highly porous structure (see, e.g., FIG. 25) that contains a liquid or soft material that is capable of moving between "pores" or "cells" in the flywheel 608 for distributing mass in response to inertial forces, which can allow for or support self-balancing of the system 600. In at least one embodiment, a flywheel 608 can have a radial barrier 656, such as a radially exterior strip, wall or seal, or, as another example, an ultra-strong composite disc, on the outer diameter or periphery for additional structural support. In at least one embodiment, the flywheel can utilize ultra-strong steel or composite wires disposed radially outwards from the center to provide tensile strength and support against centrifugal forces during flywheel operations.

In at least one embodiment, the flywheel 608 can be a laminar flywheel (see, e.g., FIGS. 21-23) comprising sheets, rings, or other layers of a first material 630 and sheets, rings, or other layers of a second material 632. In at least one embodiment, the layers alternate, such that the first material layers 630 and the second material layers 632 are coupled together with one of the second material layers 632 disposed between adjacent ones of the first material layers 630. In at least one embodiment, the layers can be configured such that each of the first material layers 630 fail independently from failure of any other of the first material layers 630. In at least one embodiment, the first and second materials 630, 632 can alternate in concentric rings (see, e.g., FIG. 24). In at least one embodiment, the first and second materials 630, 632 can alternate along the longitudinal axis A. In at least one embodiment, the flywheel 608 can include two or more layers of one material separated by one or more layers of another material.

In at least one embodiment, the second material 632 has a higher tensile strength than the first material 630. In at least one embodiment, the second material 632 can be configured to reinforce and/or to help prevent failure of the first material 630.

In at least one embodiment, the second material 632 can be a phase change material. For example, the second material 632 can have a higher tensile strength than the first material 630 in a first phase and a lower tensile strength than the first material 630 in a second phase. In at least one embodiment, the second material 632 can be configured to selectively decouple the first material layers 630 from each other and/or the second bearing portion 606.

In at least one embodiment, the system 600 can include a shaft 640 coupled between the flywheel 608 and the second bearing portion 606 (or other rotor bearing portion) and a phase change material 632 coupled between the flywheel 608 and the shaft 640. The phase change material 632 can be configured to selectively decouple the flywheel 608 from the shaft 640.

In at least one embodiment, the flywheel 608 can be a porous flywheel comprising a porous flywheel body 650 having a radially exterior surface 652 and a matrix of internal pores 654. In at least one embodiment, an annular disc or other barrier 656 can be coupled to the radially exterior surface 652 of the flywheel body 650. In at least one embodiment, one or more structural support members 658 can be coupled between the flywheel body 650 and the shaft 640 to support one or more portions of the flywheel body 650. The structural support members 658 can be or include one or more wires, rods, sleeves, rings, sheets, bars, etc., configured to support one or more portions of the flywheel body 650. The structural support members 658 can be oriented radially outwardly relative to a central longitudinal axis of the flywheel body 650. In at least one embodiment, a mass distribution material 660 can be sealed within the matrix of pores 654 of the flywheel body 650. The mass distribution material 660 can be a fluid, such as water, a particulate matter, such as sand, or a combination thereof.

In at least one embodiment, the flywheel 608 can include a flywheel body 650 having a radially exterior surface 652 and flywheel body 650 can be or include an at least partially hollow housing or shell (see, e.g., FIGS. 26-27). In at least one embodiment, the flywheel 608 can include one or more structural support members 658 coupled to the flywheel body 650 and the shaft 640 to support one or more portions of the flywheel body 650, such as by tying together or otherwise structurally supporting flywheel body 650 and shaft 640. In at least one embodiment, a mass distribution material 660 can be sealed within the flywheel body 650, such as within one or more reservoirs 662, such as a space or void, within flywheel body 650 radially between shaft 640 and radially exterior surface 652. In at least one embodiment, one or more reservoirs 662 can include a porous material with a matrix of pores 654 for containing mass distribution material 660 (see, e.g., FIG. 25). In at least one embodiment, one or more reservoirs 662 can be or include one or more empty spaces within flywheel body 650 containing mass distribution material 660 (see, e.g., FIGS. 26-27). In at least one embodiment, one or more support members 658 can be disposed within a reservoir 662 within flywheel body 650 with a first end coupled to shaft 640 and a second end coupled to flywheel body 650, such as to a radially exterior wall or another portion of flywheel body 650, for at least partially resisting separation of shaft 640 and flywheel body 650 during flywheel operations.

In at least one embodiment, the system 600 can include a flywheel shaft 640 coupled between the flywheel 608 and the second bearing portion 606. In at least one embodiment, the shaft 640 can include a first shaft portion 640A with one or more magnets 642 and a second shaft portion 640B with one or more magnets 644. In at least one embodiment, magnet 642 can be disposed adjacent a first end of the flywheel 608 and magnet 644 can be disposed adjacent a second end of the flywheel 608. Magnets 642, 644 can be attracted to one another and thereby configured to couple the flywheel 608 to the flywheel shaft 640. In at least one embodiment, magnets 642, 644 can be configured to couple shaft 640 and flywheel 608 to one another without any need for shaft 640 to pass into or through flywheel 608. In at least one embodiment, flywheel 608 need not have a central opening therethrough.

In at least one embodiment, the system 600 can include a motor and/or generator system 603 for rotating flywheel 608 (e.g., via a magnetic or other drive) and/or for generating electric power from rotation of flywheel 608. Motor and/or generator system 603 can be or include any flywheel drive and/or generator system configured to operably communicate with flywheel 608 and/or other components of system 600, whether now know or future developed.

Other and further embodiments utilizing one or more aspects of the embodiment described above can be devised without departing from the spirit of Applicant's disclosure. For example, the systems and methods disclosed herein can be used to support any type of movement, such as rotational, linear and the like. As another example, the systems and methods disclosed herein can be used to form one or more parts of other movement systems, which can include any movement system having conventional bearings, such as aircraft, passenger and other vehicles, machinery, heavy machinery, machining tools, generators, trailers, axles, actuators, or other movement systems. Further, the various methods and embodiments of the HTS-magnet bearing systems can be included in combination with each other to produce variations of the disclosed methods and embodiments.

Discussion of singular elements can include plural elements and vice-versa. References to at least one item followed by a reference to the item may include one or more items. Also, various aspects of the embodiments could be used in conjunction with each other to accomplish the understood goals of the disclosure. Unless the context requires otherwise, the word "comprise" or variations such as "comprises" or "comprising," should be understood to imply the inclusion of at least the stated element or step or group of elements or steps or equivalents thereof, and not the exclusion of a greater numerical quantity or any other element or step or group of elements or steps or equivalents thereof. The devices and systems of the disclosure can be used in a number of directions and orientations. The order of steps can occur in a variety of sequences unless otherwise specifically limited. The various steps described herein can be combined with other steps, interlineated with the stated steps, and/or split into multiple steps. Similarly, elements have been described functionally and can be embodied as separate components or can be combined into components having multiple functions.

The inventions have been described in the context of preferred and other embodiments and not every embodiment of the inventions has been described. Obvious modifications and alterations to the described embodiments are available to those of ordinary skill in the art. The disclosed and undisclosed embodiments are not intended to limit or restrict the scope or applicability of the invention conceived of by Applicant, but rather, in conformity with the patent laws, Applicant intends to fully protect all such modifications and improvements that come within the scope or range of equivalents of the following claims.

What is claimed is:

1. A system, comprising:
   a first bearing portion having an opening there through, a central longitudinal axis and an inner surface, the opening having a first dimension;
   a second bearing portion having an outside second dimension and an outer surface, the second dimension being smaller than the first dimension; and
   a flywheel coupled to the second bearing portion;
   wherein one of the first and second bearing portions includes a first magnet;
   wherein another of the first and second bearing portions is at least partially composed of a second magnet and includes a third magnet;
   wherein the second bearing portion is disposed at least partially within the opening through the first bearing portion and wherein a gap exists between the outer surface of the second bearing portion and the inner surface of the first bearing portion; and
   wherein the second bearing portion is configured to rotate about the central longitudinal axis of the first bearing portion relative to the first bearing portion;
   and further comprising a fourth magnet and a fifth magnet;
   wherein the fourth magnet is coupled to the bearing portion that includes the third magnet;
   wherein the fifth magnet is coupled to the bearing portion that includes the first magnet; and
   wherein the fourth magnet and the fifth magnet are configured to repel one another.

2. The system of claim 1, wherein the flywheel is a laminar flywheel comprising
   a first plurality of sheets of a first material; and
   a second plurality of sheets of a second material;
   wherein the first plurality of sheets and the second plurality of sheets are coupled together with one of the second plurality of sheets disposed between adjacent ones of the first plurality of sheets.

3. The system of claim 2, wherein each of the first plurality of sheets is configured to fail independently from failure of any other of the first plurality of sheets.

4. The system of claim 2, wherein the second material is a phase change material.

5. The system of claim 1, wherein the flywheel is a porous flywheel comprising a porous flywheel body having a radially exterior surface and a matrix of internal pores.

6. The system of claim 5, further comprising an annular disc coupled to the radially exterior surface of the flywheel body.

7. The system of claim 5, further comprising a plurality of structural support members coupled to the flywheel body and oriented radially outwardly relative to a central longitudinal axis of the flywheel body.

8. The system of claim 5, further comprising a mass distribution material sealed within the matrix of pores of the flywheel body.

9. The system of claim 1, wherein the first magnet and the third magnet are configured to at least partially resist longitudinal movement of the second bearing portion.

10. The system of claim 9, wherein the first magnet and the third magnet are further configured to at least partially resist lateral movement of the second bearing portion.

11. The system of claim 1, wherein at least one of the first, second and third magnets is an annular magnet.

12. The system of claim 11, wherein the annular magnet comprises a plurality of magnet segments.

13. The system of claim 1, wherein the fourth magnet and the fifth magnet are configured to at least partially resist longitudinal movement of the second bearing portion.

14. The system of claim 13, wherein the fourth magnet and the fifth magnet are further configured to at least partially resist lateral movement of the second bearing portion.

15. The system of claim 1, further comprising
   a flywheel shaft having a first shaft portion with a sixth magnet and a second shaft portion with a seventh magnet;
   wherein the sixth magnet is disposed adjacent a first end of the flywheel;
   wherein the seventh magnet is disposed adjacent a second end of the flywheel; and
   wherein the sixth magnet and the seventh magnet are attracted to one another and configured to couple the flywheel to the flywheel shaft.

16. The system of claim 1, wherein the first magnet and the third magnet have exterior surfaces that are disposed parallel to one another and at an angle relative to the central longitudinal axis.

17. The system of claim 1, wherein one of the first and second bearing portions is at least partially composed of a high-temperature superconductor (HTS); and wherein the HTS and the second magnet have exterior surfaces that are disposed parallel to one another and parallel to the central longitudinal axis.

18. The system of claim 1, wherein the fourth magnet and the fifth magnet have exterior surfaces that are disposed parallel to one another and at an angle relative to the central longitudinal axis.

19. The system of claim 1, wherein the flywheel comprises a shaft having an exterior surface, a flywheel body rotationally fixed about the exterior surface of the shaft and one or more reservoirs within the flywheel body.

20. A system, comprising:
   a first bearing portion having an opening there through, a central longitudinal axis and an inner surface, the opening having a first dimension;
   a second bearing portion having an outside second dimension and an outer surface, the second dimension being smaller than the first dimension; and
   a flywheel coupled to the second bearing portion;
   wherein one of the first and second bearing portions includes a first magnet;
   wherein another of the first and second bearing portions is at least partially composed of a second magnet and includes a third magnet;
   wherein the second bearing portion is disposed at least partially within the opening through the first bearing portion and wherein a gap exists between the outer surface of the second bearing portion and the inner surface of the first bearing portion; and
   wherein the second bearing portion is configured to rotate about the central longitudinal axis of the first bearing portion relative to the first bearing portion;
   and further comprising a fourth magnet and a fifth magnet;
   wherein the fourth magnet is coupled to the bearing portion that includes the third magnet;
   wherein the fifth magnet is coupled to the bearing portion that includes the first magnet; and wherein the fourth magnet and the fifth magnet are configured to attract one another.

21. A system, comprising:

a first bearing portion having an opening there through, a central longitudinal axis and an inner surface, the opening having a first dimension;

a second bearing portion having an outside second dimension and an outer surface, the second dimension being smaller than the first dimension; and a flywheel coupled to the second bearing portion;

wherein one of the first and second bearing portions is at least partially composed of a high-temperature super-conductor and includes a first magnet;

wherein another of the first and second bearing portions is at least partially composed of a second magnet and includes a third magnet;

wherein the second bearing portion is disposed at least partially within the opening through the first bearing portion and wherein a gap exists between the outer surface of the second bearing portion and the inner surface of the first bearing portion; and wherein the second bearing portion is configured to rotate about the central longitudinal axis of the first bearing portion relative to the first bearing portion;

and further comprising a flywheel shaft having a first shaft portion with a fourth magnet and a second shaft portion with a fifth magnet;

wherein the fourth magnet is disposed adjacent a first end of the flywheel;

wherein the fifth magnet is disposed adjacent a second end of the flywheel; and wherein the fourth magnet and the fifth magnet are attracted to one another and configured to couple the flywheel to the flywheel shaft.

* * * * *